(12) United States Patent
Miyamaru et al.

(10) Patent No.: US 7,585,257 B2
(45) Date of Patent: Sep. 8, 2009

(54) BICYCLE SIMULATION APPARATUS

(75) Inventors: Yukio Miyamaru, Saitama (JP); Atsushi Yonehana, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 870 days.

(21) Appl. No.: 11/083,129

(22) Filed: Mar. 17, 2005

(65) Prior Publication Data

US 2005/0233866 A1   Oct. 20, 2005

(30) Foreign Application Priority Data

Mar. 31, 2004   (JP) ............................. 2004-102609

(51) Int. Cl.
*A63B 22/06*   (2006.01)

(52) U.S. Cl. .......................... 482/57; 463/36

(58) Field of Classification Search ............ 482/8, 482/9, 57; 340/432; 434/29, 61, 247; 463/36; 472/60

See application file for complete search history.

(56) References Cited

U.S. PATENT DOCUMENTS

| | | | | |
|---|---|---|---|---|
| 4,976,435 A | * | 12/1990 | Shatford et al. | 463/36 |
| 5,240,417 A | * | 8/1993 | Smithson et al. | 434/61 |
| 5,462,503 A | * | 10/1995 | Benjamin et al. | 482/4 |
| 6,034,594 A | * | 3/2000 | Gray | 340/440 |
| 6,712,737 B1 | * | 3/2004 | Nusbaum | 482/8 |
| 6,881,176 B2 | | 4/2005 | Oishi et al. | |
| 2003/0171190 A1 | * | 9/2003 | Rice | 482/57 |
| 2006/0063644 A1 | * | 3/2006 | Yang | 482/4 |

FOREIGN PATENT DOCUMENTS

| | | |
|---|---|---|
| DE | 37 06 250 A1 | 9/1988 |
| EP | 1 327 465 A1 | 7/2003 |
| JP | 2589581 | 11/1998 |

* cited by examiner

*Primary Examiner*—Loan H Thanh
*Assistant Examiner*—Tam Nguyen
(74) *Attorney, Agent, or Firm*—Carrier, Blackman & Associates, P.C.; William D. Blackman; Joseph P. Carrier

(57) ABSTRACT

A bicycle simulation apparatus includes: a steering angle sensor which detects a steering angle of handlebars; a visual display which displays scenes based on a simulated travel speed and the steering angle of the handlebars; and a crank position detector which detects rotational positions of cranks. The crank position detector includes two detected protrusions on a crankshaft and left and right approach sensors. A warning section of a main controller issues warnings if it is determined that the steering angle exceeds a predetermined angle to the left or right during simulated traveling, and if it is also determined by the crank position detector that the crank is directed downward during a sharp turning operation of the handlebars. The bicycle simulation apparatus enables a more realistic driving simulation in consideration of rotational positions of simulator pedals and cranks.

16 Claims, 29 Drawing Sheets

FIG. 12

| COMMAND | PROCESS | |
|---|---|---|
| UP<br>DOWN<br>HEAVY<br>LIGHT<br>⋮ | BIRD'S EYE VIEW DISPLAY<br>DRIVER'S VIEW DISPLAY<br>INCREASE LOAD/INCREASE SPEED COEFFICIENT<br>REDUCE LOAD/REDUCE SPEED COEFFICIENT<br>⋮ | 202a |
| BIRD'S EYE POINT OF VIEW<br>DRIVER'S POINT OF VIEW<br>UPSHIFT<br>DOWNSHIFT<br>⋮ | BIRD'S EYE VIEW DISPLAY<br>DRIVER'S VIEW DISPLAY<br>INCREASE LOAD/INCREASE SPEED COEFFICIENT<br>REDUCE LOAD/REDUCE SPEED COEFFICIENT<br>⋮ | 202b |
| LEFT<br>RIGHT<br>⋮ | LEFT SIDE SCREEN DISPLAY<br>RIGHT SIDE SCREEN DISPLAY<br>⋮ | 202c |

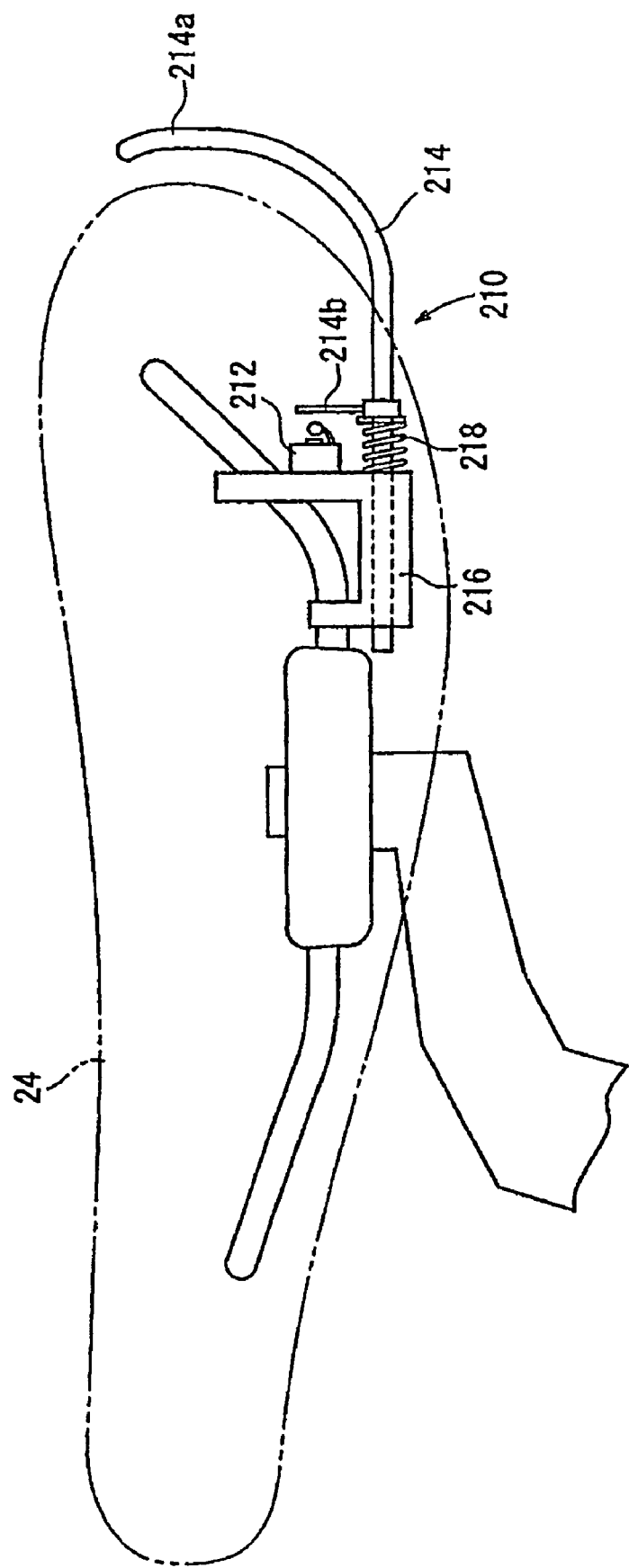

BICYCLE SIMULATION APPARATUS

CROSS-REFERENCE TO RELATED APPLICATIONS

The present invention claims priority under 35 USC 119 based on Japanese patent application No. 2004-102609, filed on Mar. 31, 2004. The subject matter of this priority document is incorporated by reference herein.

BACKGROUND OF THE INVENTION

1. Field of the Invention

The present invention relates to a bicycle simulation apparatus having application to traffic safety education, games, and physical training. More particularly, the present invention relates to a bicycle simulation apparatus in which scenes displayed on a visual display change according to operations of pedals and handlebars.

2. Description of the Background Art

Simulation apparatuses have been proposed and developed that simulate the operation of airplanes, automobiles, motorcycles, bicycles and the like. Some of the simulation apparatuses have been put to practical use. Among known simulation apparatuses, a bicycle simulation apparatus has some similarity to a motorcycle simulation apparatus, but is significantly different therefrom because a bicycle, and thus its associated simulation apparatus, has cranks and pedals. An example of a known bicycle simulation apparatus is disclosed in Japanese Registered Utility Model No. 2589581.

In a bicycle simulation apparatus, pedals and cranks for working the pedals are essential components. However, in a conventional bicycle simulation apparatus, pedals are used merely as a means to operate the bicycle simulator. In other words, there is no consideration given to rotational positions of the pedals and cranks during operation of the bicycle. Therefore, the conventional bicycle simulation apparatus lacks a sense of realism under some operation conditions, and poorly simulates the driving effects.

The present invention was made in consideration of the foregoing problem. It is an object of the present invention to provide a bicycle simulation apparatus which enables a more realistic driving simulation in consideration of the rotational positions of the pedals and cranks which are unique to bicycles.

SUMMARY OF THE INVENTION

A bicycle simulation apparatus according to the present invention comprises a bicycle simulator including a pair of cranks which have pedals provided on their distal ends, and are connected to left and right ends of a crankshaft, handlebars which can be rotated left and right; and a handlebar operation detector which detects the steering angle of the handlebars; a visual display which displays scenes based on a simulated travel speed produced by operation of the pedals and on the steering angle; a crank position detector which detects rotational positions of the cranks; and a warning section which issues warnings when all of the following circumstances occur: when it is determined that the bicycle simulator is traveling based on the simulated travel speed, when the steering angle exceeds a predetermined amount; and when it is determined that the crank in an operation direction of the handlebars is directed downward.

With such bicycle simulation apparatus, it is possible to provide realistic driving simulation by issuing a warning if the pedal and the crank facing toward the inside of a corner are directed downward, when the bicycle is assumed to be cornering, in consideration of the rotational positions of the pedals and the cranks.

In this case, when the warning is issued by the warning section, an image in which a bicycle and a person riding the bicycle stagger is displayed on the visual display, and a simulated sound of the pedal rubbing a road surface is emitted from a sound generation section. Accordingly, the sense of realism is further enhanced.

Moreover, if one or more of the crank position detectors are provided with each of the pair of cranks, it is possible to individually detect that the respective cranks are directed downward.

If the crank position detectors include a detected portion which rotates along with the crankshaft, and an approach sensor which detects the detected portion, the rotational positions of the cranks can be easily and accurately detected with a low-cost configuration.

Furthermore, if the warning section issues a warning under the condition that a simulated bank angle obtained from the simulated travel speed and the steering angle is $\geqq$ a predetermined angle, the sense of realism is further enhanced.

In the bicycle simulation apparatus according to the present invention, a warning is issued when the pedal and the crank facing toward the inside of a corner are directed downward, in the case where the bicycle is assumed to be cornering, upon consideration of the rotational positions of the pedals and the cranks. Therefore, a realistic driving simulation is provided. Moreover, the sense of realism is further enhanced when this warning is made both visible and audible. Specifically, an image in which a bicycle, and a person riding the bicycle, staggers is displayed on the visual display, and the simulated sound of the pedal rubbing the road surface is emitted from the sound generation section.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 12 is an explanatory view showing contents of town travel dictionary data.

FIG. 29 is a schematic side view of a modified example of a grip detector.

DETAILED DESCRIPTION OF THE INVENTION

With reference to the accompanying FIGS. 1 to 29, description will now be given below of an embodiment of a bicycle simulation apparatus according to the present invention.

Figure 1:
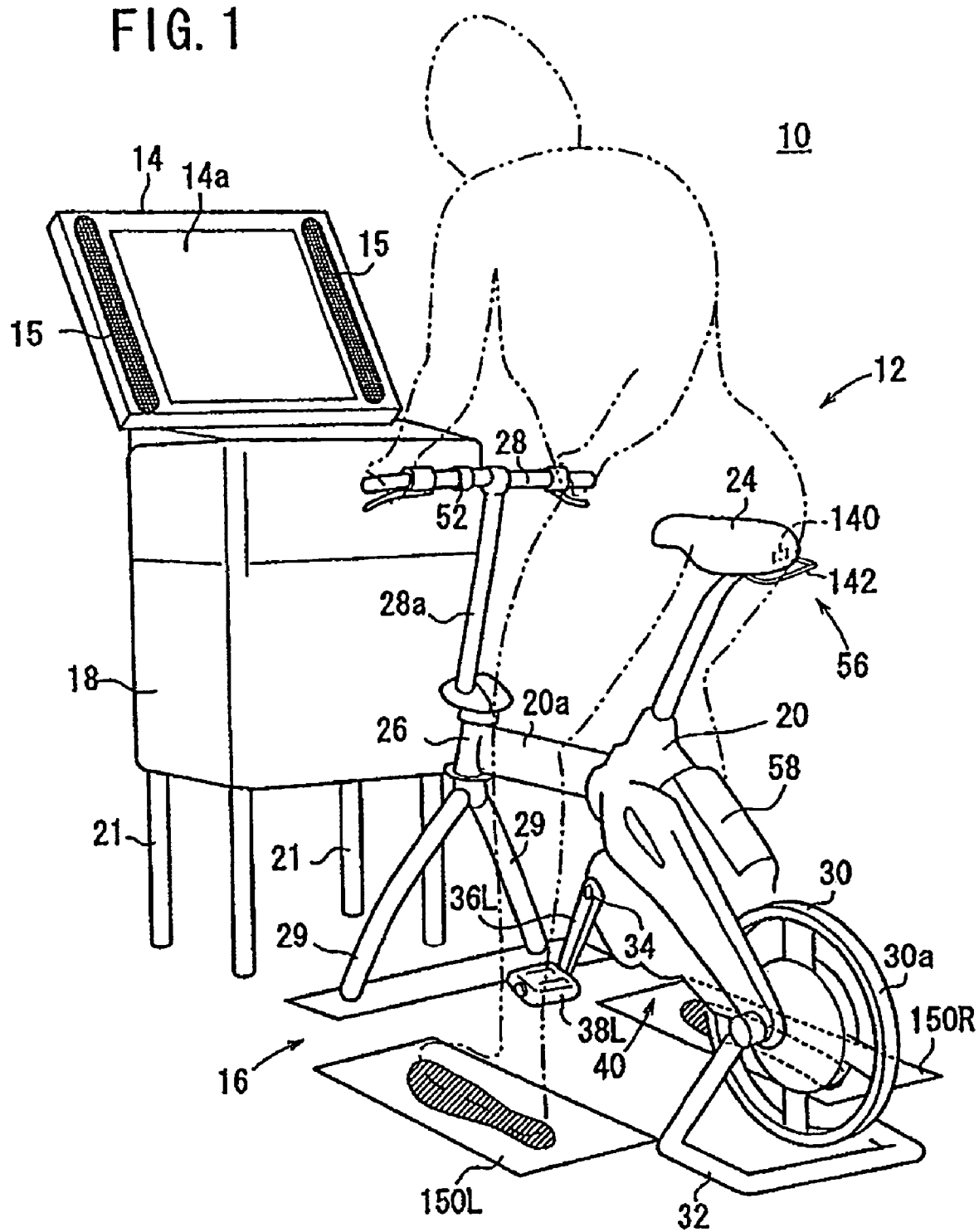
FIG. 1 is a perspective view of a bicycle simulation apparatus according to an embodiment of the present invention.

As shown in FIG. 1, a bicycle simulation apparatus 10 according to this embodiment includes a bicycle simulator 12, a monitor 14 which displays on a screen 14a scenes corresponding to operation of the bicycle simulator 12, and speakers (sound generation sections) 15 which gives audible instructions to a driver and produces simulated sounds. The bicycle simulation apparatus 10 also includes a mat switch 16 provided at a position where the driver mounts and dismounts the bicycle simulator 12, and a main controller 18 which performs the entire control of the bicycle simulation apparatus 10. The main controller 18 is disposed in front of the bicycle simulator 12, and the monitor 14 and the speakers 15 are disposed above the main controller 18 at positions which are easily visible by the driver.

Figure 10:
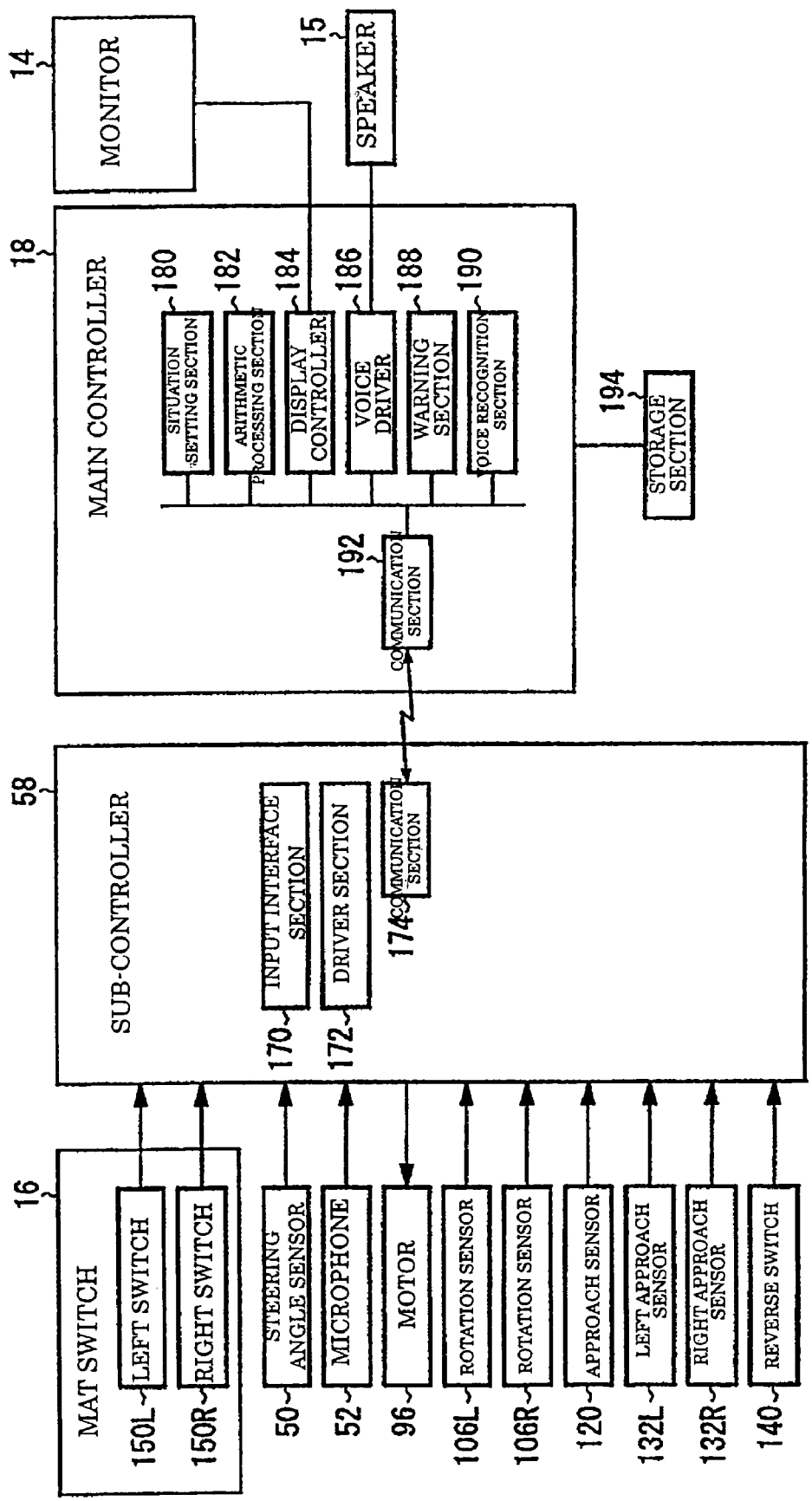
FIG. 10 is a block diagram showing an electrical configuration of the bicycle simulation apparatus.

On the screen 14a of the monitor 14, a voice recognition mark 19 (see FIG. 14) is displayed to indicate that the voice recognition process is enabled under an operation of a voice recognition section 190 (see FIG. 10). The voice recognition mark 19 includes a mark having a shape of a microphone, and a character string consisting of the words "microphone on." The main controller 18, the monitor 14, and the speakers 15 are adjustably supported by four supports 21 so as to permit movement of the controller 18 and visual display 14 in the vertical direction. Accordingly, height adjustment of the visual display 14 is possible in accordance with the physical size of the driver. Alternatively, the visual display 14 may be, for example, a small monitor provided on handlebars 28.

Next, the bicycle simulator 12 will be described. Hereinafter, mechanisms provided on the left and right sides of the bicycle simulator 12 will be discriminated from each other by attaching "L" to reference numerals of those on the left side and attaching "R" to reference numerals of those on the right side.

The bicycle simulator 12 includes a frame 20, a saddle 24 connected to the frame 20 through a seat pillar, and handlebars 28 mounted to a head tube 26 of the frame 20. The head tube 20 provides a supporting axis which permits rotation of the handlebars thereabout. The bicycle simulator 12 includes two front forks 29 which provide a stand which fixes and supports the head tube 26, an iron flywheel 30 provided at a rear end of the frame 20, and a back stand 32 which supports the frame 20 so as to set the flywheel 30 away from the floor surface. Height adjustment of the saddle 24 and the handlebars 28 is possible in accordance with the physical size of the driver.

Figure 2:
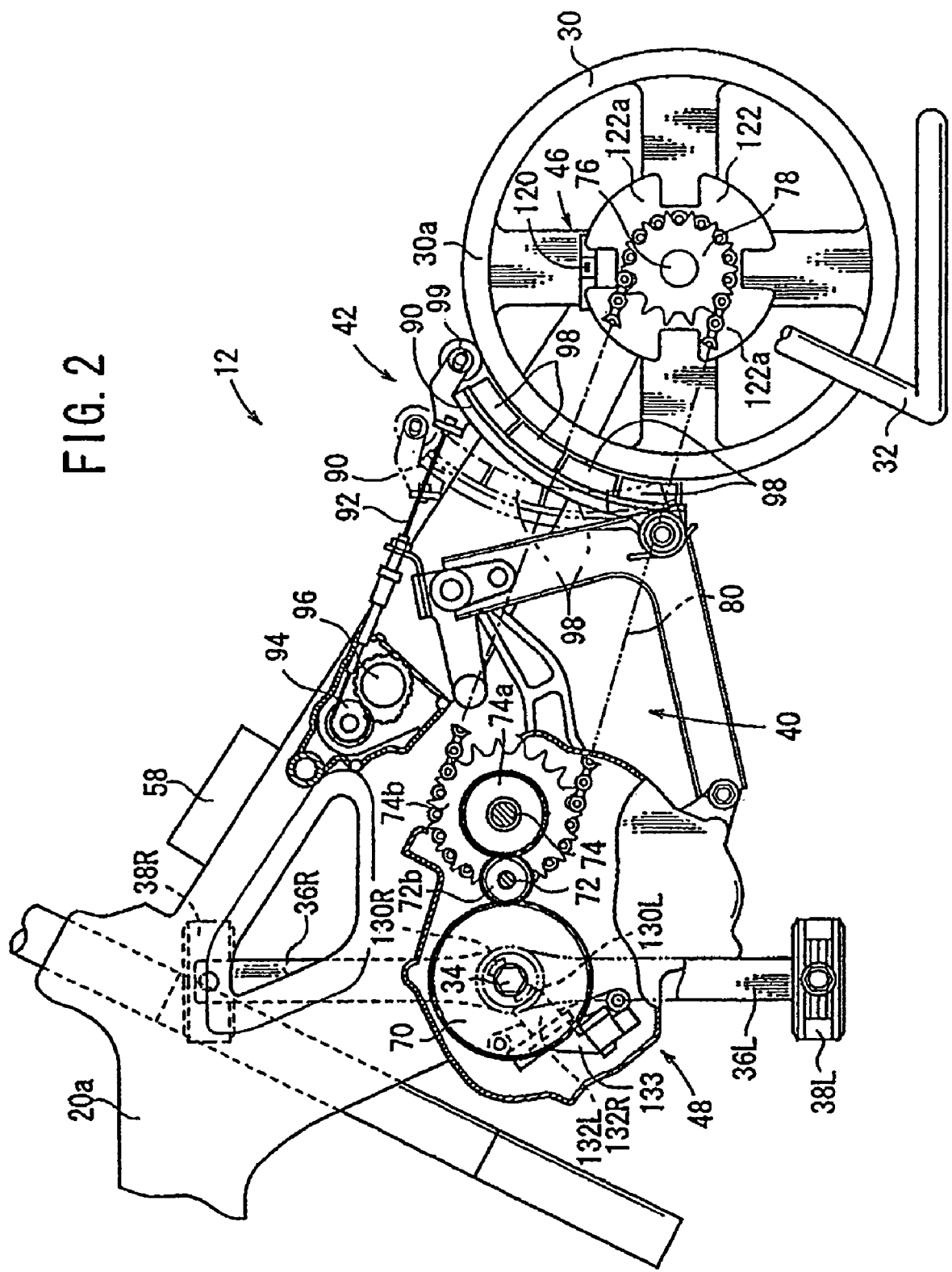
FIG. 2 is a side view showing a partially enlarged cross section of a bicycle simulator thereof.
Figure 4:
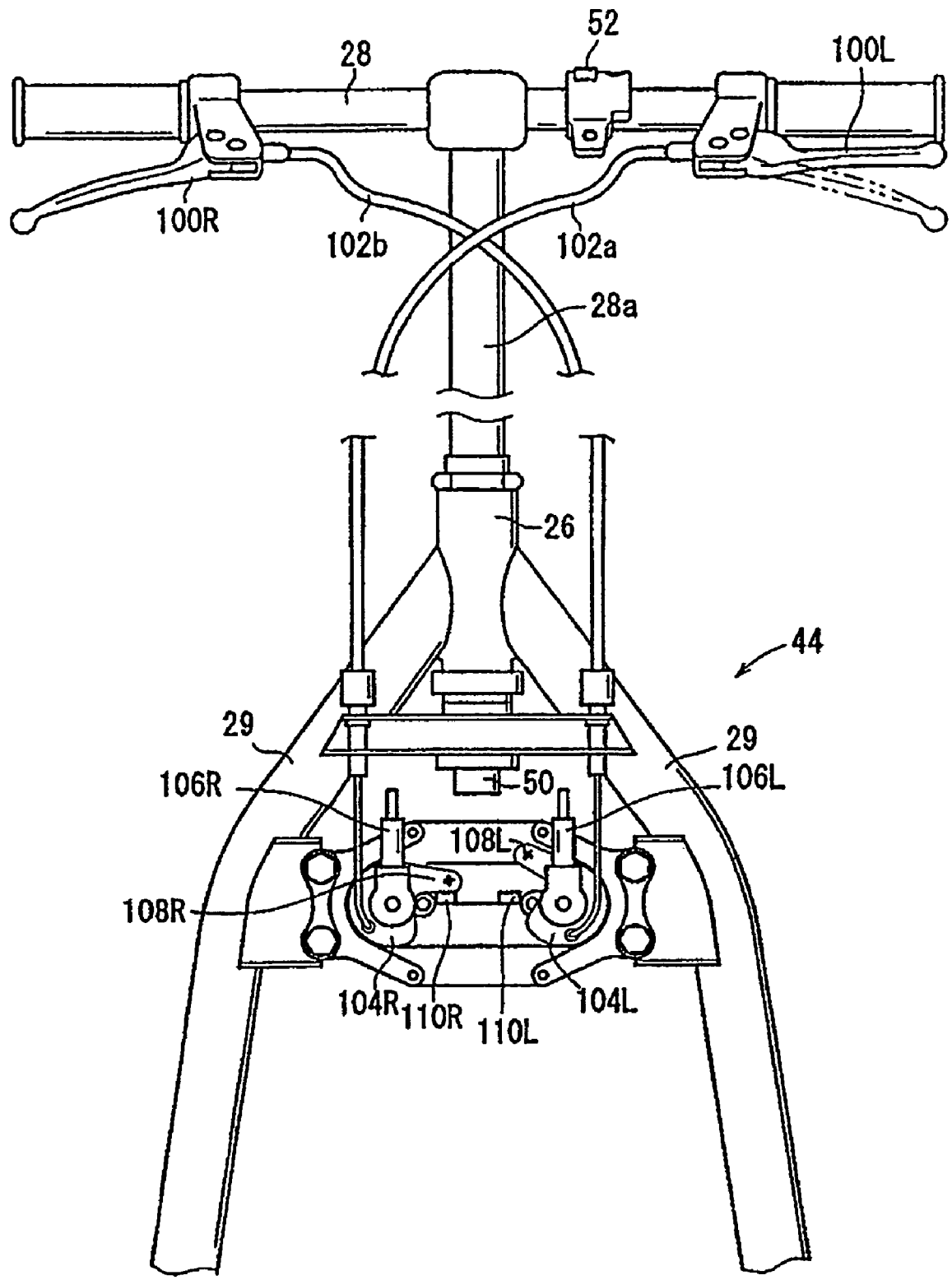
FIG. 4 is a front view of the bicycle simulator.

As shown in FIGS. 1, 2 and 4, the bicycle simulator 12 includes a pair of cranks 36L and 36R which are connected to left and right ends of a crankshaft 34, respectively. Pedals 38L and 38R are provided at respective distal ends of the cranks 36L and 36R, and a driving force transmission section 40 cooperates with the crankshaft 34 so as to transmit the rotation of the crankshaft 34 to the flywheel 30.

Furthermore, the bicycle simulator 12 includes an electric mechanism which comprises a load section 42 which applies a load to the flywheel 30, a braking instruction section 44 for braking the flywheel 30, and a speed detector 46 which detects rotational speed of the flywheel 30. The electric mechanism includes a crank position detector 48 which detects rotational positions of the cranks 36L and 36R, and a steering angle sensor (handlebar operation detector) 50 (see FIG. 4) which detects a steering angle $\theta_H$ of the handlebars 28. The electric mechanism also includes a microphone 52 for inputting voice of the driver, and a grip detector 56 provided underneath the rear of the saddle 24. Moreover, in the bicycle simulator 12, a sub-controller 58 is provided for receiving signals from the above-described electric mechanism and performing a predetermined control. The sub-controller 58 and the main controller 18 can communicate with each other in real time.

Figure 3:
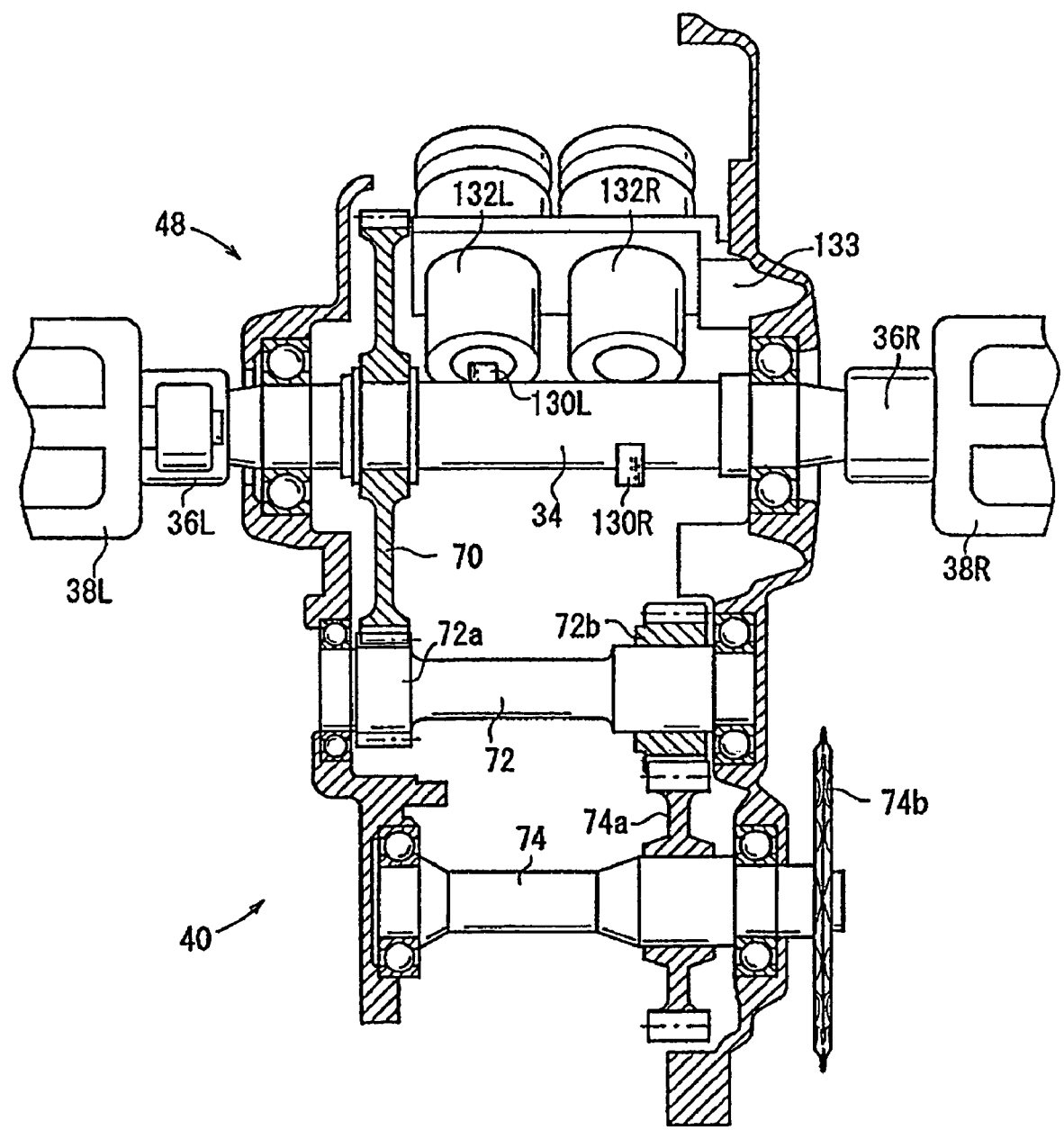
FIG. 3 is a plan view showing a cross section of a driving force transmission section.

As shown in FIGS. 2 and 3, the driving force transmission section 40 includes a driving gear 70 provided on the crankshaft 34, a first intermediate shaft 72 including a driven gear 72a and a driving gear 72b, and a second intermediate shaft 74 including a driven gear 74a and a driving sprocket 74b. The driving gear 70 engages with the driven gear 72a, and the driving gear 72b engages with the driven gear 74a. Accordingly, the second intermediate shaft 74 is rotated by a driving force of the crankshaft 34 through the first intermediate shaft 72.

Moreover, the driving force transmission section 40 includes a freehub 76 which axially supports the flywheel 30, a driven sprocket 78 provided on the freehub 76, and a chain 80 which transmits driving force of the driving sprocket 74b to the driven sprocket 78. Each of the crankshaft 34 and the first and second intermediate shafts 72 and 74 is axially supported by two bearings. The freehub 76 has a built-in bearing.

The freehub 76 transmits, by use of its internal one-way clutch mechanism, only forward rotational driving force of the driven sprocket 78 to the flywheel 30. Therefore, if the crankshaft 34 is rotated backward, or if the rotation of the crankshaft 34 is stopped during forward rotation of the flywheel 30, a rotational state of the flywheel 30 at the time (forward rotation or stop) is maintained regardless of the crankshaft 34.

The load section 42 includes an arc-shaped load plate 90 which has a first end pivotally supported by the frame 20. A pull cable 92 is connected to the opposed, second end of the load plate 90, and is wound on a drum 94. A motor 96 rotates and drives the drum 94. The load plate 90 is provided concentrically with the flywheel 30, and has a plurality of ferrite magnets 98 attached to its inner circumferential surface to face a peripheral rim 30a of the flywheel 30. The load plate 90 is actuated by a torsion spring so as to be tilted toward the flywheel 30. When the pull cable 92 is not pulled, a roller 99, provided at the second end of the load plate 90, comes into contact with the rim 30a and is rotated. In this event, the ferrite magnets 98 and the rim 30a come very close to each other. Accordingly, when the flywheel 30 is rotated, eddy current flows through the rim 30a to cause an eddy current loss. Thus, a load can be applied to the flywheel 30. Applying a load by eddy current enables silent operation with less mechanical noise.

Moreover, by winding the pull cable 92 under the operation of the motor 96, the load plate 90 is inclined so as to separate the ferrite magnets 98 from the rim 30a. Therefore, the load applied on the flywheel 30 can be adjusted under the operation of the motor 96. When the load plate 90 is positioned at its most distant location from the rim 31a, the load becomes approximately zero (0). The load applied on the flywheel 30 by the load section 42 also acts as braking force, and the load section 42 serves as braking means. The load section 42 has no sliding section for braking. Thus, replacement of components such as a brake pad is not required, as is necessary in a brake type which produces a load by mechanical braking.

Furthermore, when the pedals 38L and 38R are operated when an assumed gear ratio is high, it is possible to allow the driver to feel heavy in operating the pedals 38L and 38R by bringing the load plate 90 close to the rim 30a. Accordingly, a gear change simulation can be performed. In this case, when the pedals 38L and 38R are not operated, the load plate 90 is preferably separated from the rim 30a so as to avoid unnatural braking. It is possible to determine whether the pedals 38L and 38R are operated based on signals obtained from left and right approach sensors 132L and 132R.

As shown in FIG. 4, the braking instruction section 44 includes two brake levers 100L and 100R provided on the handlebars 28. Brake wires 102a and 102b extend to the front forks 29 from the handlebars 28. Pulleys 104L and 104R, which can be elastically rotated, are provided, and include rotation sensors 106L and 106R. The brake wires 102a and 102b cross each other at some midpoint thereof, and both ends of the respective wires are connected to the brake levers 100L and 100R and the pulleys 104R and 104L, respectively.

When the brake levers 100L and 100R are not actuated, the pulleys 104L and 104R are elastically urged by springs (not shown) so as to allow protrusions 108L and 108R to be directed upward. In this event, the brake levers 100L and 100R are elastically actuated by the pulleys 104L and 104R and separated from the handlebars 28.

By pulling the brake levers 100L and 100R toward the handlebars 28, the pulleys 104L and 104R are elastically rotated, and the protrusions 108L and 108R are directed downward. The pulleys 104L and 104R can be rotated until the protrusions 108L and 108R come into contact with stoppers 110L and 110R formed on a frame portion extending between the respective forks 29.

Rotation angles of the pulleys 104L and 104R can be detected by the rotation sensors 106L and 106R, and signals representing the detected angle are supplied to the sub-controller 58, respectively. In the sub-controller 58, braking force is applied to the flywheel 30 by controlling the load section 42 based on the detected rotation angle signals of the pulleys 104L and 104R. In other words, braking force is applied to the flywheel 30 by controlling the load section 42 based on signals corresponding to an amount of operation of the brake levers 100L and 100R (hereinafter referred to as brake operation). For example, a load is increased by bringing the load plate 90 closer to the flywheel 30 in proportion to a value obtained by adding the rotation angles of the pulleys 104L and 104R. When this value becomes maximum, the load plate 90 is brought closest to the flywheel 30. When the brake operation is not performed, the load plate 90 is set most distant from the flywheel 30 so as to set the load to approximately zero (0).

In the braking instruction section 44, the brake operation is converted into electric signals by the rotation sensors 106L and 106R. Thus, the amount of brake operation can be recognized by the sub-controller 58, and fine processing and adjustment corresponding to the amount of brake operation amount are possible. In addition, the electrically driven load section 42 can be also used as a brake.

Moreover, as shown in FIG. 4, the steering angle sensor 50 is provided at a lower end of the head tube 26, and detects the rotation angle of a stem 28a. The microphone 52 is provided on the handlebars 28 and is close to the face of the driver. Thus, voice of the driver is clearly inputted in the bicycle simulator apparatus 10. The steering angle sensor 50 and the microphone 52 are connected to the sub-controller 58, and supply an angle signal of a steering angle $\theta_B$ and a voice signal thereof, respectively.

As shown in FIG. 2, the speed detector 46 includes a speed pickup 120 provided on the frame 20 by use of a bracket, and a pickup rotor 122 which is rotated coaxially and integrally with the flywheel 30. The pickup rotor 122 has four radial blades 122a, and the speed pickup 120 detects the rotational speed of the flywheel 30 by sensing the passing of each of the blades 122a in front thereof. The flywheel 30 can be regarded as a wheel in an actual bicycle. By detecting the rotational speed of the flywheel 30, a simulated travel speed of the bicycle simulator 12 can be detected. A detection signal of the speed pickup 120 is supplied to the sub-controller 58.

Figure 5:
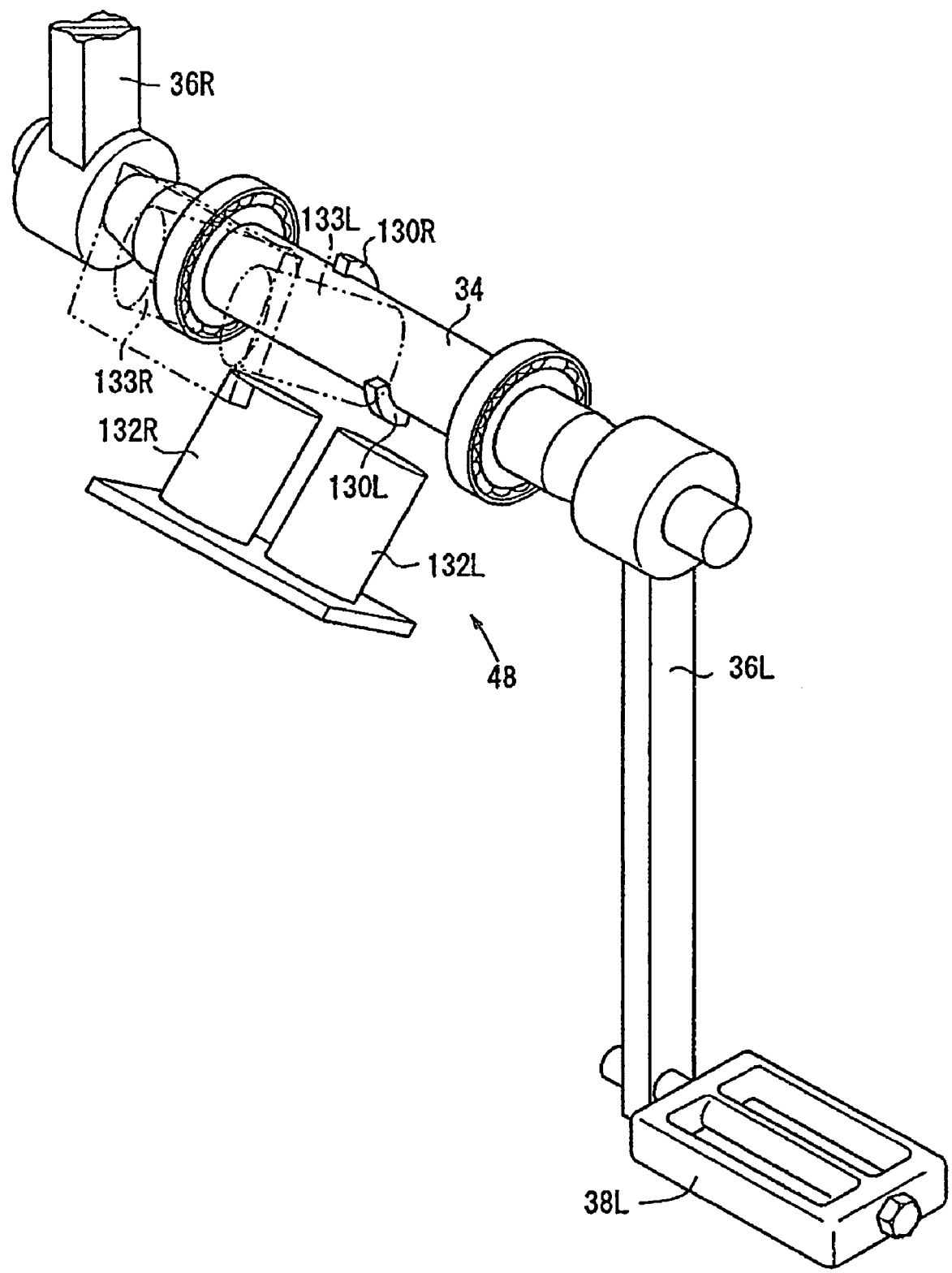
FIG. 5 is a schematic perspective view of the driving force transmission section.

As shown in FIGS. 2, 3, and 5, the crank position detector 48 includes detected protrusions 130L and 130R which are provided on the left and right sides of the crankshaft 34 at equal distances from the center of the crankshaft 34. The crank position detector further includes the left and right approach sensors 132L and 132R. The left and right approach sensors 132L and 132R are provided in the vicinity of the crankshaft 34 by means of a stay 133, and are arranged in such a manner that the respective detected protrusions 130L and 130R pass near the fronts of the respective detecting portions as the crankshaft 34 rotates. The left and right approach sensors 132L and 132R may be directly attached to the frame 20 or a predetermined casing.

The left and right approach sensors 132L and 132R are, for example, sensors using Hall elements, and are activated when the detected protrusions 130L and 130R as detected matters are positioned in front of the respective detection portions. By using the left and right approach sensors 132L and 132R for the crank position detector 48, rotational positions of the cranks can be easily detected using a low-cost configuration.

The detected protrusions 130L and 130R are protrusions that extend circumferentially 60 degrees in a fan-like form around the crankshaft 34. When the crank 36L is directed downward and the crank 36R is directed upward, the detected protrusion 130L is attached so as to be directed at a 45 degree angle clockwise from the vertically downward position in FIG. 2 (hereinafter referred to as the base angle), and the detected protrusion 130R is attached so as to be directed at a 180 degree angle from the base angle.

The left and right approach sensors 132L and 132R are provided in positions where the detected protrusions 130L and 130R can be detected at the base angle, respectively. Specifically, the left approach sensor 132L is turned on if the center of the detected protrusion 130L is positioned within plus or minus 30 degrees of the base angle when the crankshaft 34 is rotated, and is otherwise turned off. Meanwhile, the right approach sensor 132R is turned on if the center of the detected protrusion 130R is positioned within plus or minus 30 degrees of the base angle when the crankshaft 34 is rotated, and is otherwise turned off. In other words, the left approach sensor 132L is turned on when the crank 36L and the pedal 38L on the left side are positioned within plus or minus 30 degrees of the downward direction, and the right approach sensor 132R is turned on when the crank 36R and the pedal 38R on the right side are positioned within plus or minus 30 degrees of the downward direction. On-off signals detected by the left and right approach sensors 132L and 132R are supplied to the sub-controller 58.

Moreover, as indicated by broken lines in FIG. 5, a left approach sensor 133L which detects the detected protrusion 130L and a right approach sensor 133R which detects the detected protrusion 130R may be provided in positions at 90 degrees clockwise from the base angle. Accordingly, when the left approach sensor 133L is turned on, it is possible to detect that the crank 36L is horizontally directed forward, and when the right approach sensor 133R is turned on, it is possible to detect that the crank 36R is horizontally directed forward. Thus, for example, an image of the cranks of the bicycle and of feet of the driver, which are displayed on the screen 14a, can be changed in stages according to actual angles of the cranks 36L and 36R and can be shown in animation. Consequently, more realistic image is generated, and obtained by the driver.

Figure 6:
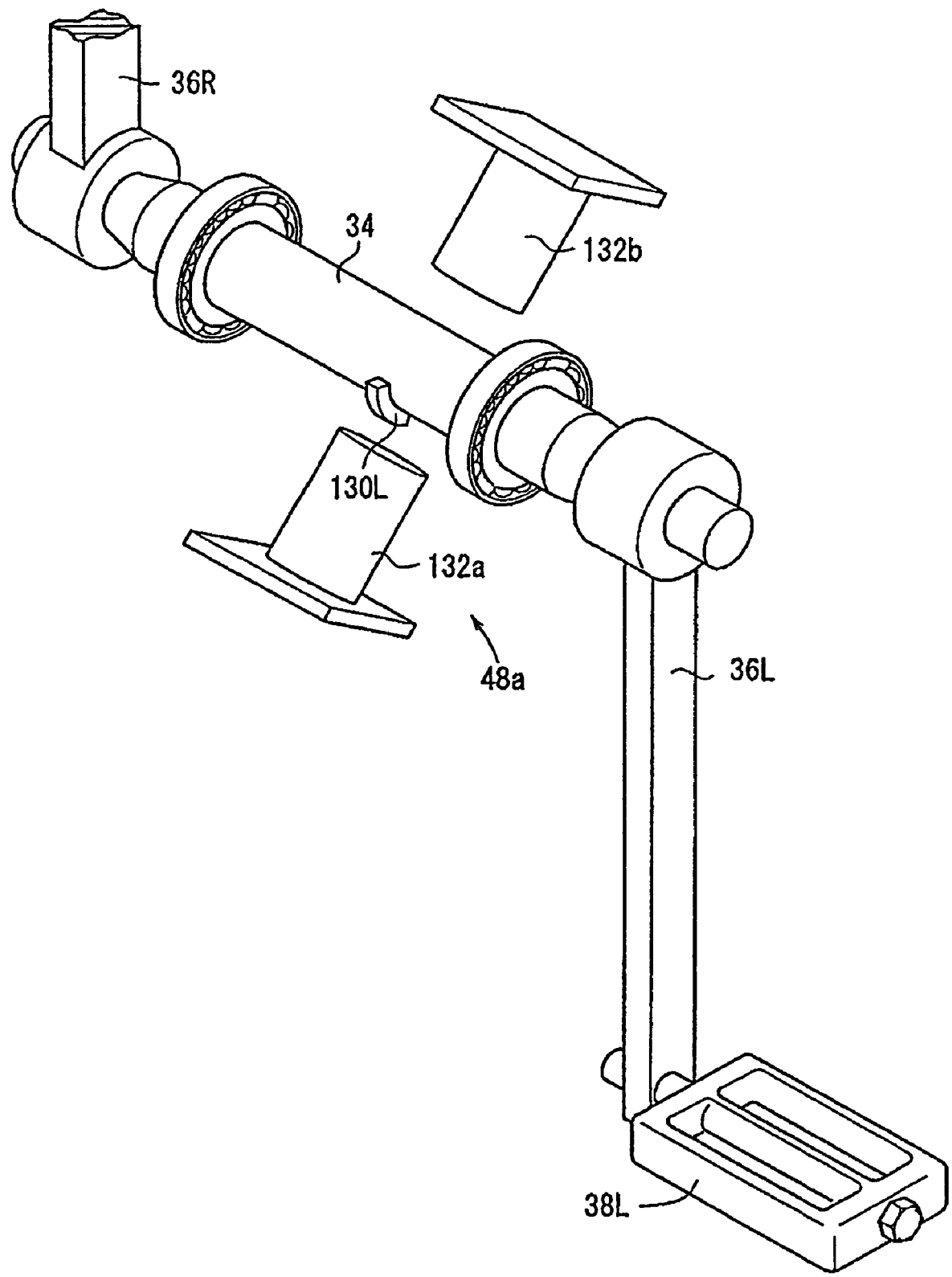
FIG. 6 is a schematic perspective view of a modified example of the driving force transmission section.

Furthermore, a modified crank position detector 48a is shown in FIG. 6. According to this modified example, the detected protrusion 130R may be omitted, and one detected protrusion 130L and two approach sensors 132a and 132b may be provided. In addition, the approach sensors 132a and 132b may be provided opposite to each other across the crankshaft 34. In this case, it is possible to detect that, when the approach sensor 132a corresponding to the left approach sensor 132L detects the detected protrusion 130L and is turned on, the left crank 36L is directed downward, and that, when the approach sensor 132b corresponding to the right approach sensor 132R detects the detected protrusion 130L and is turned on, the right crank 36R is directed downward. Furthermore, an alternative crank position detector may be provided. For example, an alternative crank position detector is a rotation sensor such as a rotary encoder which minutely detects the rotation angle of the crankshaft 34.

Figure 7:
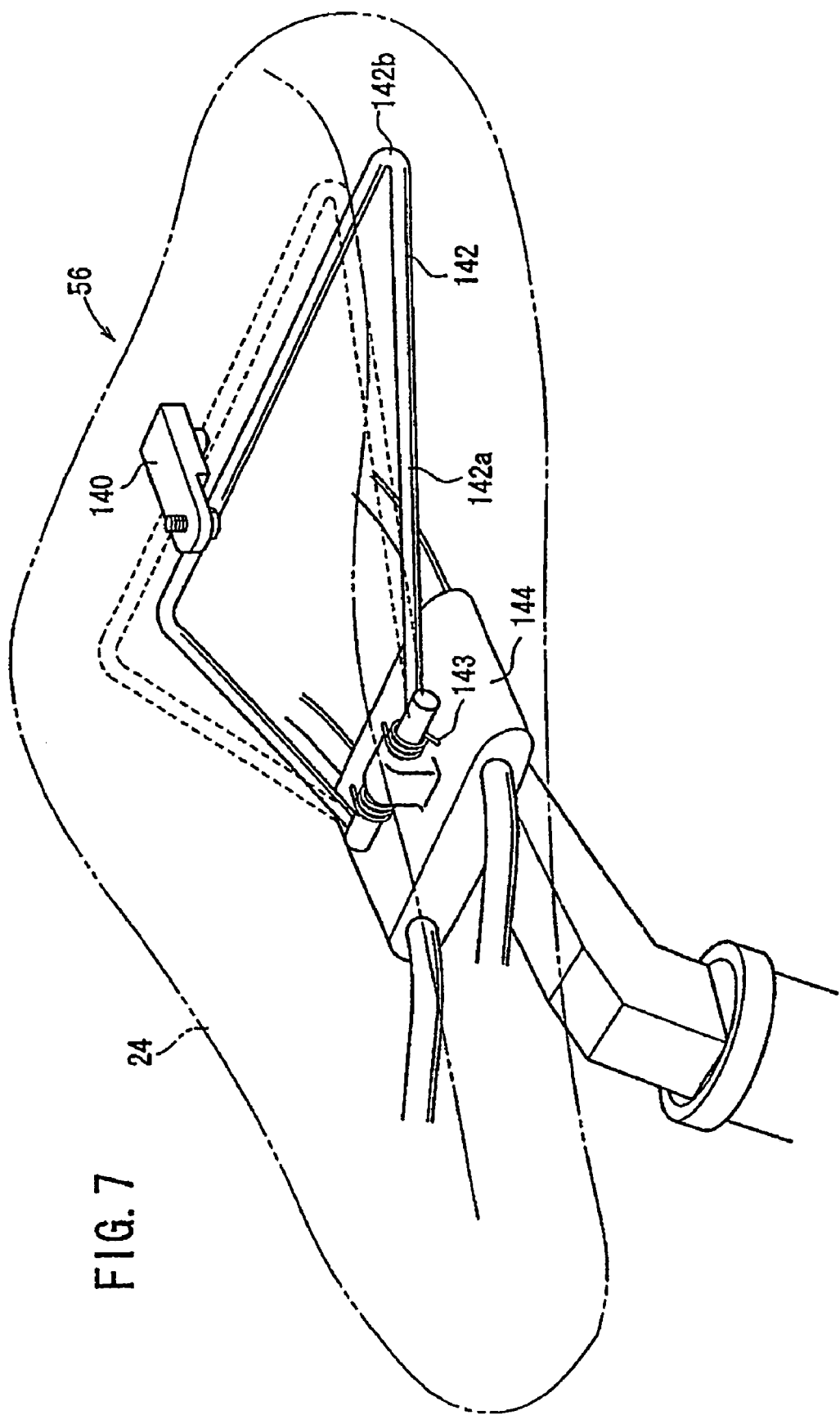
FIG. 7 is a perspective view showing a main portion of a saddle.

As shown in FIG. 7, the grip detector 56 includes a reverse switch 140. Reverse switch 140 is a momentary limit switch, and is provided underneath the rear of the saddle 24. The grip detector 56 also includes a lever 142 for turning on and off the reverse switch 140.

The lever 142 includes a front portion 142a and a rear portion 142b. The front portion 142a of the lever 142 is axially supported, while being elastically urged downward, by springs 143 on a saddle supporting unit 144, and contacts a predetermined stopper. The rear portion 142b of the lever 142 has a plate shape and is of approximately the same width as that of a rear portion of the saddle 24. The rear portion 142b is disposed below the reverse switch 140. The lever 142 is manually operated and can be lifted while moderate reaction force is applied thereto by the springs 143. The lever 142 is lifted until the rear portion 142b comes into contact with the reverse switch 140. At contact, the reverse switch 140 is turned on, and the on signal is supplied to the sub-controller 58. The lever 142 is operated when the driver is off the bicycle, and may be operated by gripping the rear portion 142b and an upper portion of the rear of the saddle 24.

Since the reverse switch 140 is operated through the lever 142, the driver, when off the bicycle, can easily operate the reverse switch 140. Moreover, by operating the reverse switch 140 through the lever 142, the rear portion 142b, which is an operating portion of the lever 142, can be disposed in a spot which can be most easily reached by a hand of the driver. Moreover, size and shape of the reverse switch 140 and the number thereof are selected with a high degree of freedom in design.

Since the grip detector 56 is provided underneath the rear of the saddle 24, the detector 56 never becomes an obstacle when the driver sits on the saddle 24, and/or when the driver operates the pedals 38L and 38R.

Since the reverse switch 140 is operated by means of the lever 142, the driver, when off the bicycle, can easily operate the reverse switch 140. Moreover, the reverse switch 140 itself may be small. Since the grip detector 56 is provided underneath the rear of the saddle 24, the detector 56 never becomes an obstacle when the driver sits on the saddle 24.

As shown in FIG. 1, the mat switch 16 includes a left switch 150L and a right switch 150R, which are independent of each other. The left and right switches 150L and 150R are disposed in positions where the driver can step thereon when the driver gets off the bicycle. Specifically, the driver can step thereon with his/her both feet by straddling a front tube 20a of the frame 20. More specifically, the left foot steps on the left switch 150L, and the right foot steps on the right switch 150R while the driver straddles a front tube 20a of the frame 20. The left and right switches 150L and 150R are turned on by the driver stepping thereon, and the on signals are supplied to the sub-controller 58.

Figure 8:
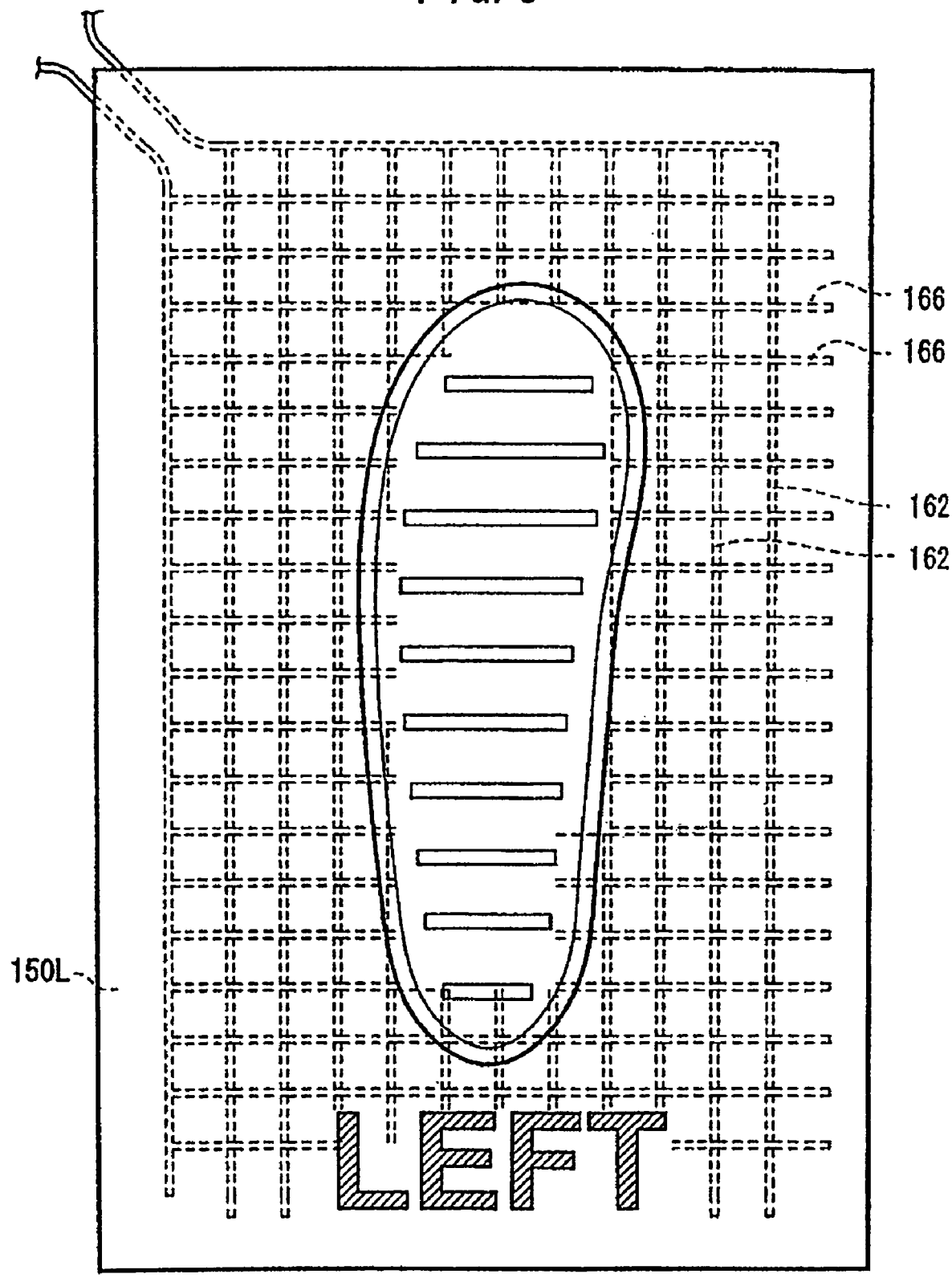
FIG. 8 is a plan view of a left switch.
Figure 9:
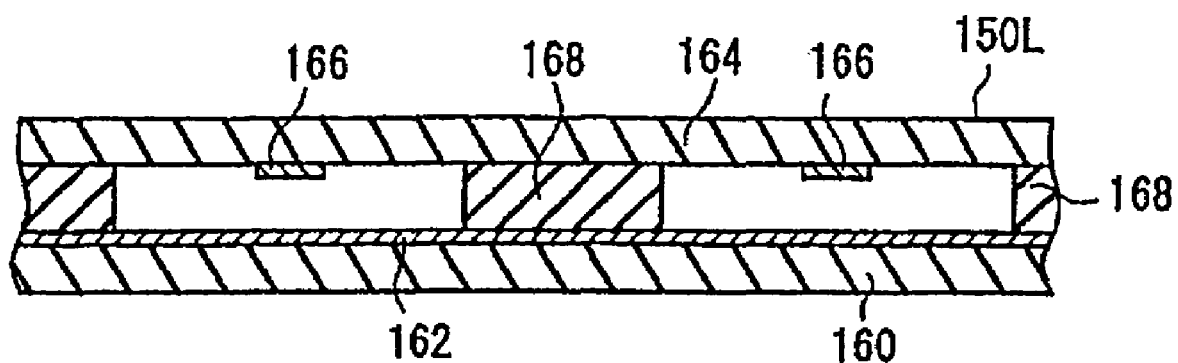
FIG. 9 is a cross-sectional view of the left switch.

As shown in FIGS. 8 and 9, the left switch 150L is in the form of a thin mat and includes a rear rubber sheet 160. A plurality of longitudinal electrode lines 162 are attached to an inner surface of the rear rubber sheet 160. The left switch 150L also includes a front rubber sheet 164. Transverse electrode lines 166 attached to an inner surface of the front rubber sheet 164. An insulating material 168 is provided between the longitudinal electrode lines 162 and the transverse electrode lines 166. Each of the longitudinal electrode lines 162 is connected to one of two terminals (not shown), and each of the transverse electrode lines 166 is connected to the other of the two terminals. The front rubber 164 and the insulating material 168 are soft and elastically deformed by a foot stepping on the front rubber 164. In this event, the longitudinal electrode lines 162 and the transverse electrode lines 166 come into contact with each other at intersections thereof. Thus, the two terminals are electrically connected to each other to turn on the switch. Meanwhile, when the driver lifts his/her foot, the front rubber 164 and the insulating material 168 are restored to their original shapes, and the longitudinal electrode lines 162 and the transverse electrode lines 166 are separated from each other. Accordingly, the switch is turned off. On outer surface of the front rubber 164, a pattern of the left foot and letters "LEFT" are printed. The right switch 150R has the same structure as that of the left switch 150L, and, on the outer surface thereof, a pattern of the right foot and letters "RIGHT" are printed.

As described above, the left and right switches 150L and 150R are pressure-sensitive switches which sense a load of the driver's feet. However, alternative switches may be employed, including, but not limited to, temperature-sensitive, infrared, optical or capacitance-type switches, as long as the switches are capable of sensing landing of the driver's feet.

As shown in FIG. 10, the sub-controller 58 includes an input interface section 170, a driver section 172 and a first communication section 174, and mainly serves as an interface between the electric mechanism of the bicycle simulator 12 and the main controller 18. The input interface section 170 is connected to the microphone 52 and the various sensors described above, and receives analog signals and digital signals. The driver section 172 controls the motor 96. The first communication section 174 transmits/receives various data to/from the main controller 18.

The main controller 18 includes: a situation setting section 180 which sets a situation of driving simulation; an arithmetic processing section 182 which performs arithmetic processing according to traveling situations; a display controller 184 which controls display of the visual display monitor 14; a voice driver 186 which performs voice output of the speakers 15; a warning section 188 which gives a predetermined warning to the driver; the voice recognition section 190 which recognizes voice inputted from the microphone 52; and a second communication section 192 which controls communication with the first communication section 174.

In a practical sense, the main controller 18 includes a CPU (central processing unit) mainly for control and, for data storage, a ROM (read only memory), a RAM (random access memory), an HD (hard disk) and the like. The respective functional sections of the main controller 18, shown in FIG. 10, are implemented by reading programs recorded on the HD by the CPU, and then executing the programs in cooperation with the ROM, the RAM and predetermined hardware. Moreover, the main controller 18 is connected to a large capacity storage section 194 and can write and read various data.

Figure 11:
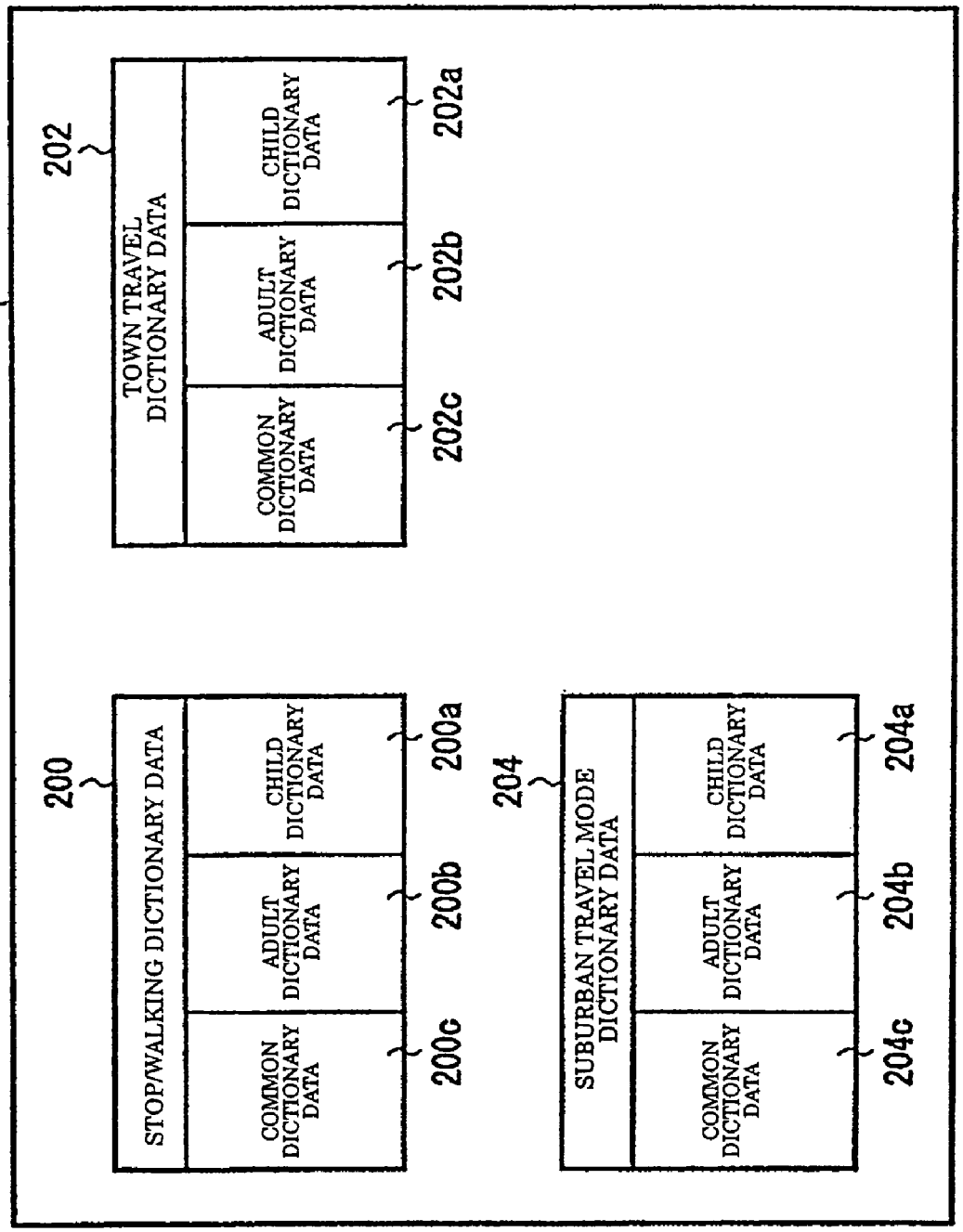
FIG. 11 is an explanatory view showing classification of dictionary data recorded in a storage section.

As shown in FIG. 11, in the storage section 194, three kinds of dictionary data corresponding to a walking mode, a walking back mode and a travel mode are recorded, which are used with the voice recognition section and will be described later. Specifically, stop/walking dictionary data 200 used in modes other than the travel mode, town travel dictionary data 202 used in a situation of traveling through town in the travel mode, and suburban travel dictionary data 204 used in a situation of traveling in the suburbs in the travel mode are recorded in the storage section 194. The stop/walking dictionary data 200 includes: child dictionary data 200a used when the driver is a child; adult dictionary data 200b used when the driver is an adult; and common dictionary data 200c used for both children and adults. Similarly, the town travel dictionary data 202 includes child dictionary data 202a, adult dictionary data 202b and common dictionary data 202c, and the suburban travel dictionary data 204 includes child dictionary data 204a, adult dictionary data 204b and common dictionary data 204c.

In the respective stop/walking dictionary data 200, town travel dictionary data 202 and suburban travel dictionary data 204 (hereinafter collectively referred to also as dictionary data), pieces of phrase data are recorded. Editing, such as addition and deletion of the phrase data, can be performed using predetermined procedures. Although the respective dictionary data are disclosed herein as classified into those for children and those for adults, the data may be classified using other criteria, such as by language (for example, Japanese and English).

As shown in FIG. 12, the town travel dictionary data 202 is formed of a command field 206 and a process field 208. The respective fields are divided for the child dictionary data 202a, the adult dictionary data 202b and the common dictionary data 202c, and the respective data are recorded therein.

In a command field 206a of the child dictionary data 202a, phrase data such as "up," "down," "back," "heavy" and "light" are recorded. In the process field 208 corresponding to the above-described phrase data, processes to be implemented based on the phrase data are recorded. Specifically, a process corresponding to "up" is "bird's eye view display," which means to display on the screen 14a scenes from a bird's eye point of view. A process corresponding to "down" is "driver's view display," which means to display scenes on the screen 14a from the viewpoint of the driver himself/herself. A process corresponding to "heavy" is "increase load/increase speed coefficient," which means to increase the load applied on the flywheel 30 as well as to increase the speed coefficient for calculating simulated speed. A process corresponding to "light" is "reduce load/reduce speed coefficient," which means to reduce the load applied on the flywheel 30 as well as to reduce the speed coefficient.

Moreover, in a command field 206b of the adult dictionary data 202b, phrase data such as "bird's eye point of view," "driver's point of view," "upshift" and "downshift" are recorded. The respective phrase data are set and recorded so as to implement the same processes as those of "up," "down," "heavy" and "light" in the child dictionary data 202a.

In a command field 206c of the common dictionary data 202c, phrase data such as "left" and "right" are recorded. Processing corresponding to "left" is "left side screen display," which means to display on the screen 14a an image on the left side of the driver at the point. A process corresponding to "right" is "right side screen display," which means to display on the screen 14a an image on the right side of the driver at the point.

The stop/walking dictionary data 200 and the suburban travel dictionary data 204 also have the same format as that of the town travel dictionary data 202. In the stop/walking dictionary data 200 and the suburban travel dictionary data 204, processes required for stop/walking and suburban travel, and phrase data for implementing the processes are recorded. In the stop/walking dictionary data 200, although portions of the phrase data described above, such as "left" and "right" are recorded, other portions of the phrase data, such as "heavy," "light," "upshift" and "downshift," which are unnecessary in stopping and walking, are not recorded.

Note that the stop/walking dictionary data 200, the town travel dictionary data 202 and the suburban travel dictionary data 204 are also called voice filters since the respective data act so as to output a predetermined voice command process (see FIG. 27) after receiving recognized driver's voice commands.

Next, with reference to FIGS. 13 to 27, a method for performing driving simulation of a bicycle by use of the bicycle simulation apparatus 10, having the configuration as described above, will be described. The following description relates to processes implemented by the main controller 18 and the sub-controller 58 in cooperation with each other after the both controllers are started by turning on a predetermined power switch. In the following description, process of the main controller 18 and process of the sub-controller 58 are not discriminated from each other. Moreover, the processes are implemented in the order of the designated step numbers unless otherwise noted.

Figure 13:
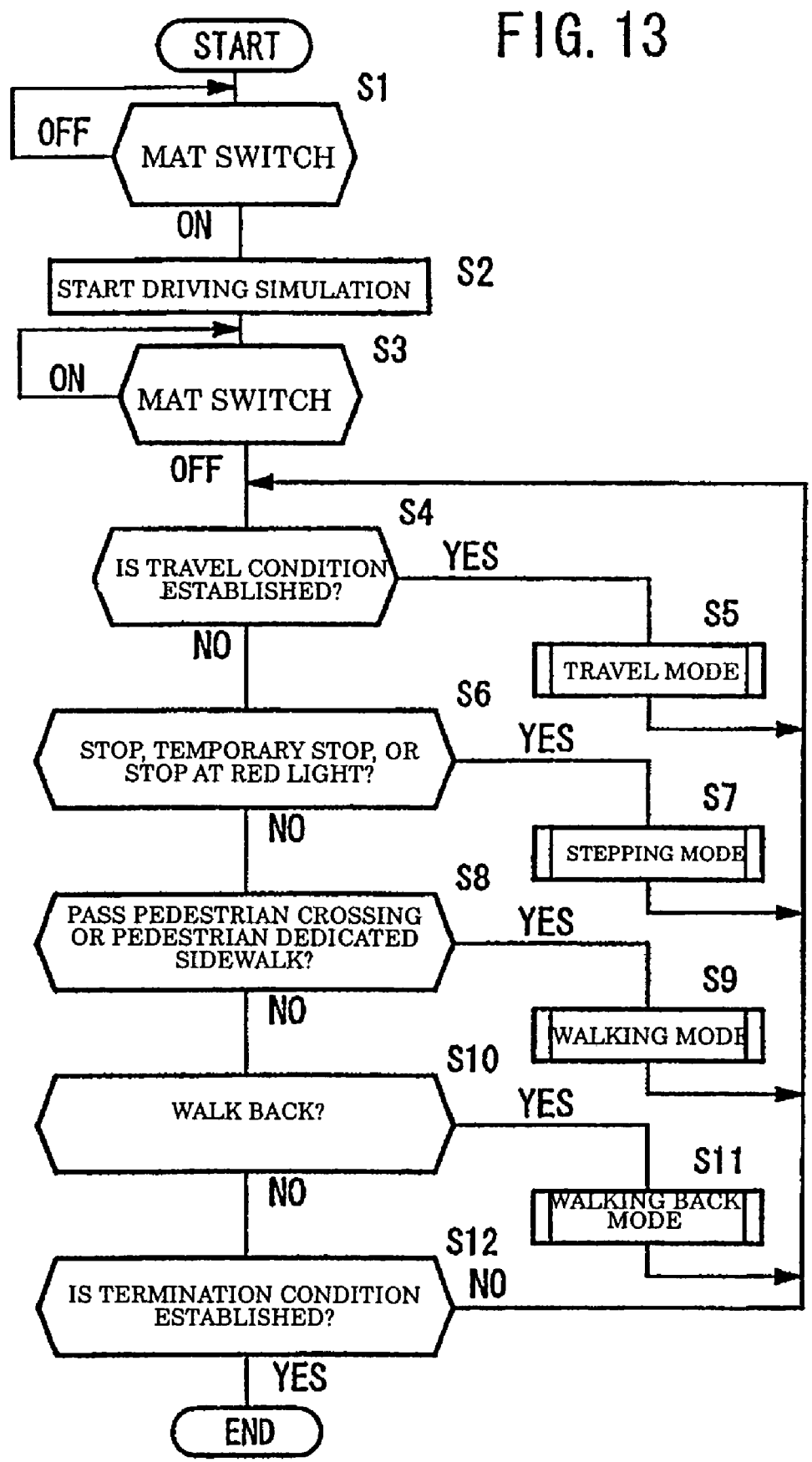
FIG. 13 is a flowchart showing a main routine of a method for performing driving simulation of a bicycle by use of the bicycle simulation apparatus.
Figure 14:
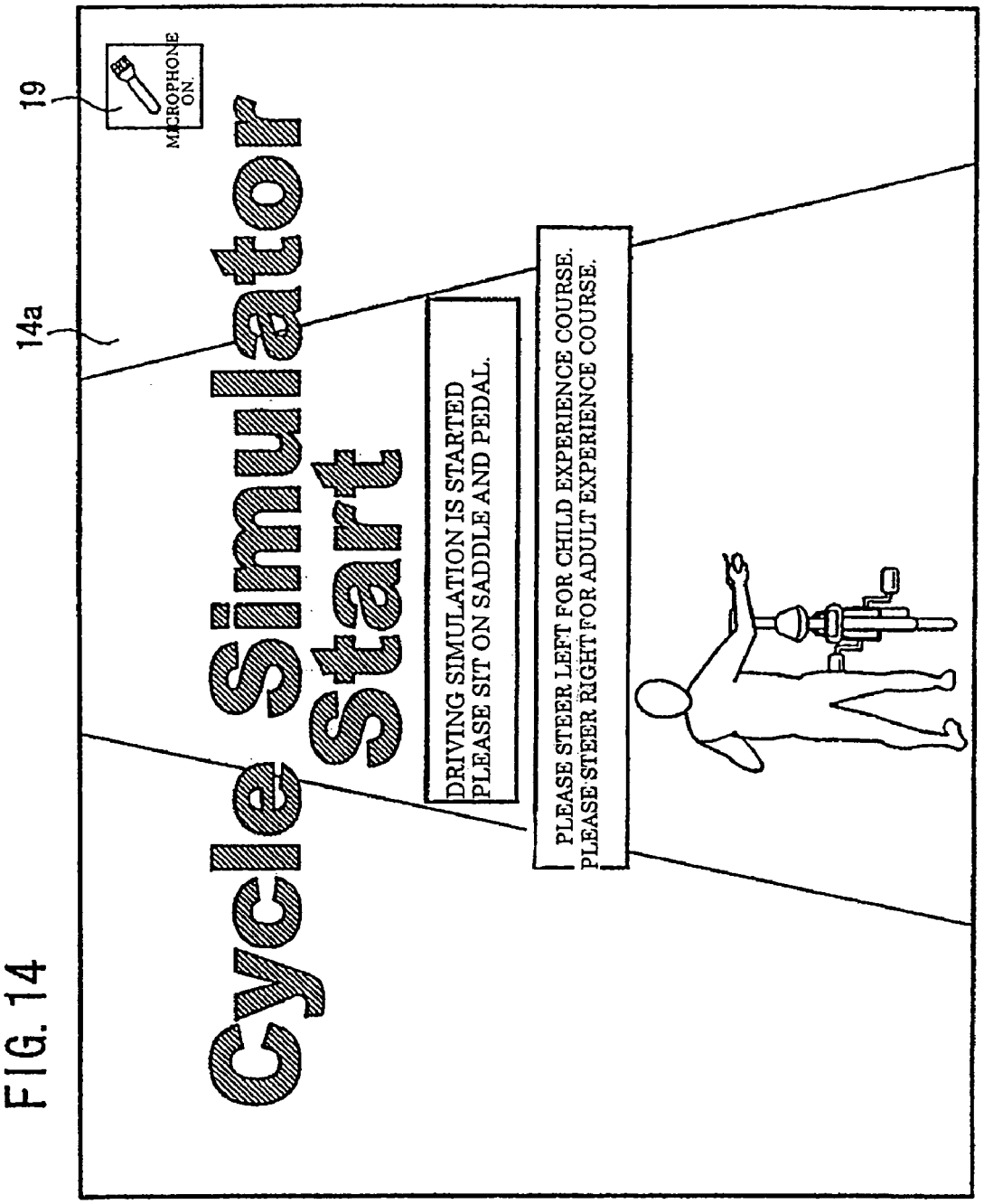
FIG. 14 is a view showing a start screen.

In Step S1 of FIG. 13, it is checked whether the mat switch 16 is turned on. Specifically, if at least one of the left and right switches 150L and 150R of the mat switch 16 is turned on, the process moves to Step S2, and if the both switches are off, the process stands by in Step S1. In other words, when the driver stands on the mat switch 16, the process automatically moves to Step S2. In the meantime, the process stands by in Step S1, and a predetermined power saving mode (for example, the monitor 14 is turned off) can be set.

In Step S2, the driving simulation is started, and a predetermined start screen (see FIG. 14) is displayed on the screen 14a. On this start screen, an image of a stopped bicycle, and an image of a person that is the driver standing next to the bicycle, are displayed. Moreover, a phrase "Driving simulation is started. Please sit on the saddle and pedal." is displayed on the screen 14a, or a similar voice message is announced from the speakers 15 (hereinafter collectively referred to as "make an instruction"). Furthermore, an instruction that "Please steer left for child experience course. Please steer right for adult experience course" is made.

As described above, by stepping on the mat switch 16, the driving simulation can be automatically started. Accordingly, the driving simulation can be comfortably started without complicated operations. Moreover, the driver may easily perform operations according to instructions given on the screen 14 or from the speakers 15. Thus, easy operation of the simulator 10 is possible without a manual and the like, and even a child can perform the driving simulation.

In Step S3, it is checked whether the mat switch 16 is turned off. Specifically, when both of the left and right switches 150L and 150R are turned off, the process moves to Step S4, and when at least one of the left and right switches 150L and 150R is on, the process stands by in Step S3.

Specifically, when the driver sits on the saddle 24 and lifts both his/her feet from the mat switch 16, the process automatically moves to Step S4, and actual travel in the driving simulation can be started. In this event, the start screen described above is terminated, and the image of the bicycle and an image of a person riding the bicycle are displayed.

In this event, if it is recognized that the handlebars 28 are operated to the left based on a signal of the steering angle sensor 50, it is determined that the child experience course is to be executed and the driver is a child. Moreover, if it is recognized that the handlebars are operated to the right, it is determined that the adult experience course is to be executed and the driver is an adult. Thus, predetermined flags according to the respective courses are set.

In Step S4, it is checked whether predetermined travel conditions are established. When the travel conditions are established, the process moves to the travel mode of Step S5, and when the travel conditions are not established, the process moves to Step S6.

In Step S6, it is checked whether the driving simulation is stopped, temporarily stopped or in a situation of a red light. If the operation is stopped, temporarily stopped or in the situation of the red light, the process moves to a stepping mode of Step S7. In other cases, the process moves to Step S8.

In Step S8, it is checked whether the driving simulation is simulating a situation of passing a pedestrian priority road such as a pedestrian crossing or a pedestrian dedicated road such as a sidewalk. In the case of passing the pedestrian priority road or the pedestrian dedicated road, the process moves to a walking mode of Step S9. In other cases, the process moves to Step S10.

In Step S10, it is checked whether the driving simulation is simulating a situation of walking the bicycle backward. In the case of walking the bicycle backward, the process moves to a walking back mode of Step S11. In other cases, the process moves to Step S12.

In Step S12, it is determined whether predetermined termination conditions are established. If the termination conditions are established, the driving simulation is terminated. If the conditions are not established, the process returns to Step S2 to continue the driving simulation. Moreover, after Steps S5, S7, S9, and S11 are terminated, the process also returns to Step S2.

In the case of terminating the driving simulation, as in the case of Step S1 described above, it is checked whether the mat switch 16 is turned on. In this case, when the mat switch 16 is turned, it is possible to detect that the driver has gotten off the bicycle simulator 12. Based on this, the driving simulation is terminated, and the process returns to the standby state such as the predetermined power saving mode. Note that, in Step S2 described above, if the bicycle simulator 12 is not operated at all within a predetermined period after the mat switch 16 is turned off, it is assumed that the driver once stepped on the mat switch 16 but left without riding the bicycle simulator 12. Therefore, also in this case, the process may return to the standby state.

Next, the travel mode will be described. The travel mode is a mode which permits the driver to perform simulated travel by working the pedals 38L and 38R and steering the handlebars 28 while sitting on the saddle 24.

Figure 15:
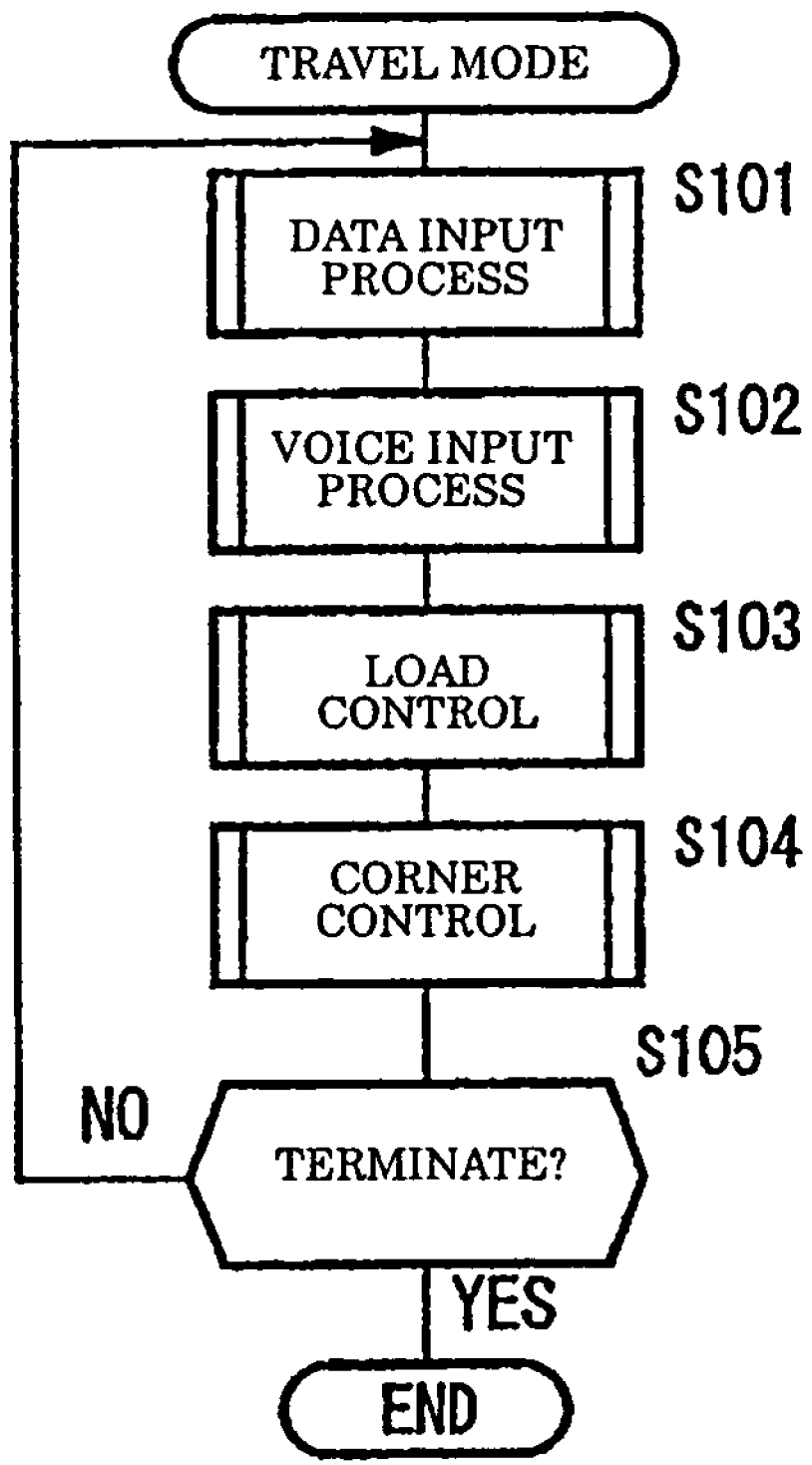
FIG. 15 is a flowchart of a travel mode.

As shown in FIG. 15, when the simulation proceeds to the travel mode per Step S5 in FIG. 13, the following steps are executed. First, in Step S101, a data input process is performed. In this input process, signals of the steering angle sensor 50, the rotation sensors 106L and 106R, the speed pickup 120, the left approach sensor 132L, the right approach sensor 132R, and the reverse switch 140 are read. Among those signals, analog signals are subjected to predetermined A/D conversion, and digitized data is read.

Moreover, in this input process, data inputted from the speed pickup 120 is FV converted to obtain a simulated travel speed V. In this event, if an assumed gear ratio is high, the travel speed V is obtained by multiplying a rotational speed of the flywheel 30, which is obtained by FV conversion, by a speed coefficient of not less than 1.0 corresponding to the gear ratio.

Figure 17:
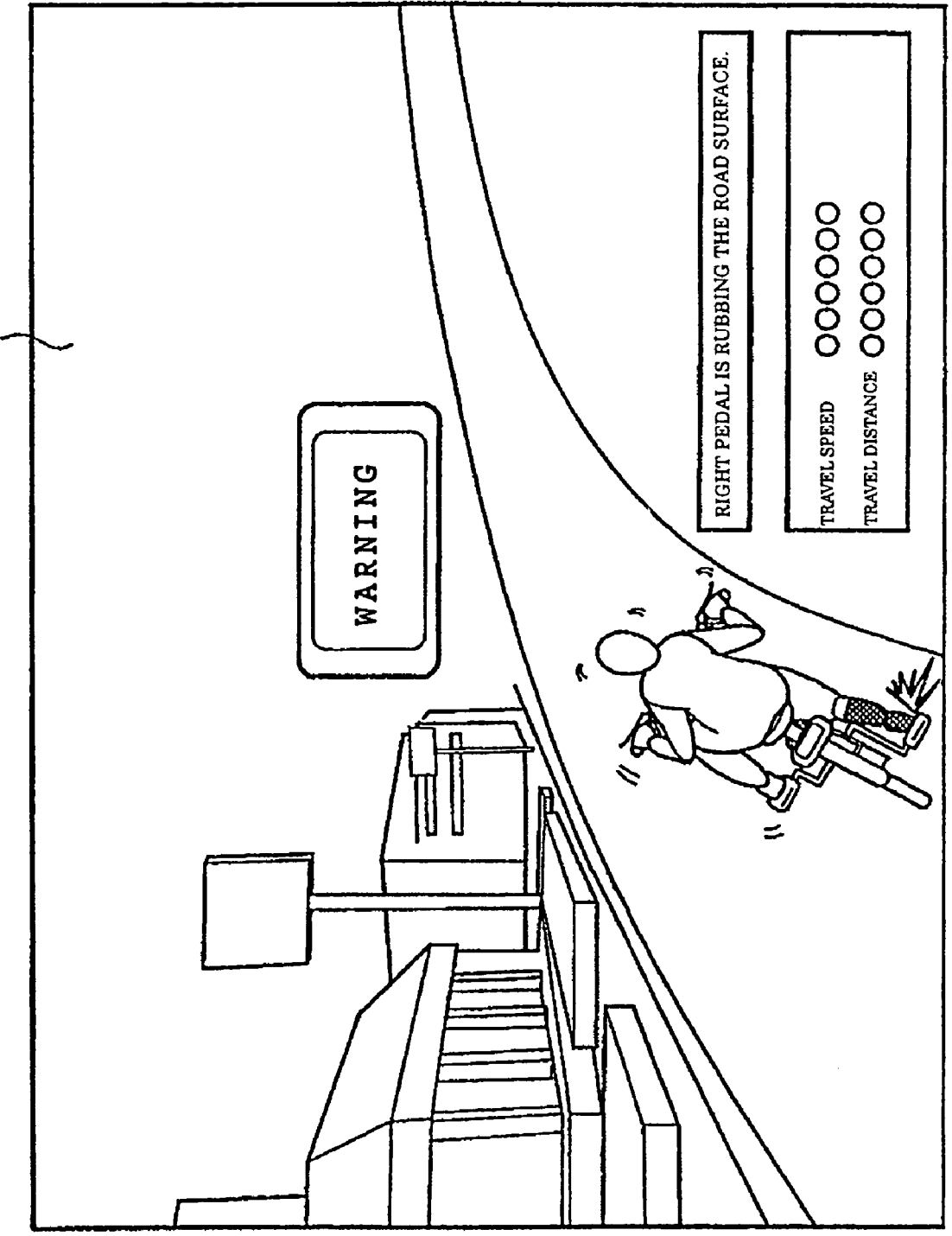
FIG. 17 is a screen display showing a warning during corner traveling.

Furthermore, a travel distance, a maximum speed, an average speed, a travel time and the like may be obtained as needed and displayed on the screen 14a (see FIG. 17). Still furthermore, a rotational speed of the crankshaft 34 may be obtained as needed by use of the left and right approach sensors 132L and 132R, and displayed on the screen 14a. If an image is displayed by changing a rotational speed of the feet of the driver on the screen 14a according to the crankshaft rotational speed, a more realistic image can be obtained. It is physically important to maintain a proper value of the crankshaft rotational speed in a long-distance travel of the bicycle. Display of the crankshaft rotational speed on the screen 14a is suitable for the purpose of training.

The travel speed V is not necessarily obtained by the speed detector 46, and may be one based on parameters generated by working the pedals 38L and 38R of the driver. For example, the travel speed V may be estimated from the crankshaft rotational speed and the signals of the rotation sensors 106L and 106R indicating the amount of brake operation.

In Step S102, a voice input process is performed under the operation of the voice recognition section 190, and voice of the driver, which is inputted from the microphone 52, is recognized. The details of this voice input process will be described later.

In Step S103, load control is performed for the flywheel 30. In this load control, if the driving simulation is simulating acceleration or an upward climb, the load is increased. On the other hand, during simulations of traveling on a flat road or traveling downward, the load is reduced. Moreover, the load is increased approximately in proportion to a value obtained by adding the signal of the rotation sensor 106L and the signal of the rotation sensor 106R. The signals of the rotation sensors 106L and 106R are associated with brake operations. Thus, the load is increased by these brake operations, and a braking action is achieved.

As described above, the load is applied on the flywheel 30 by controlling a tilt angle of the load plate 90 under the operation of the motor 96, thereby changing the distance between the ferrite magnets 98 and the rim 30a.

In Step S104, corner control is performed in the case where the simulated travel situation is cornering. Cornering includes traveling around a corner, making an U-turn and the like. The details of the corner control will be described later.

In Step S105, it is determined whether to terminate the travel mode by checking predetermined conditions. If the travel mode is to be continued, the process returns to Step S101 described above.

Note that, during execution of the travel mode described above, the signal of the mat switch 16 is checked. If the mat switch 16 is turned on during traveling in which the travel speed V is not 0, an instruction "Do not put your foot on the floor during operation." may be made. It is only necessary for the driver to step on the mat switch 16 in order to terminate the driving simulation of the bicycle simulation apparatus 10. Thus, no special operations are required.

Meanwhile, in addition to the process of the travel mode shown in FIG. 15, the processes of the display controller 184 are concurrently executed by multitask processing. The display controller 184 is implemented while transmitting/receiving data to/from an execution section of the travel mode, and performs control for changing scenes to be displayed on the screen 14a. In this display control, based on the travel speed V obtained in Step S101 described above and the steering angle $\theta_H$ of the handlebars 28, which is detected by the steering angle sensor 50, the scenes to be displayed on the screen 14a are changed in real time.

Moreover, the viewpoint of the scenes displayed on the screen 14a is changed based on the voice command obtained in Step S102 described above. When the voice command received is "left," a scene assumed to be on the left side of the driver is displayed, and when the voice command received is "right," a scene assumed to be on the right side of the driver is displayed. When the voice command received is "front," the display is returned to the front view scene as viewed by the driver.

Furthermore, when the voice command received is "up," a bird's-eye scene facing forward obliquely from behind is displayed together with the image of the bicycle and the image of the person on the bicycle. When the voice command received is "down," a scene facing forward from the viewpoint of the driver himself/herself is displayed. When the voice command received is "rearward," a scene facing forward from a virtual vehicle running behind is displayed.

The display controller 184 described above is also concurrently operated as multitasking in the stepping mode, the walking mode and the walking back mode, and performs display on the screen 14a in real time throughout operation in these modes.

Figure 16:
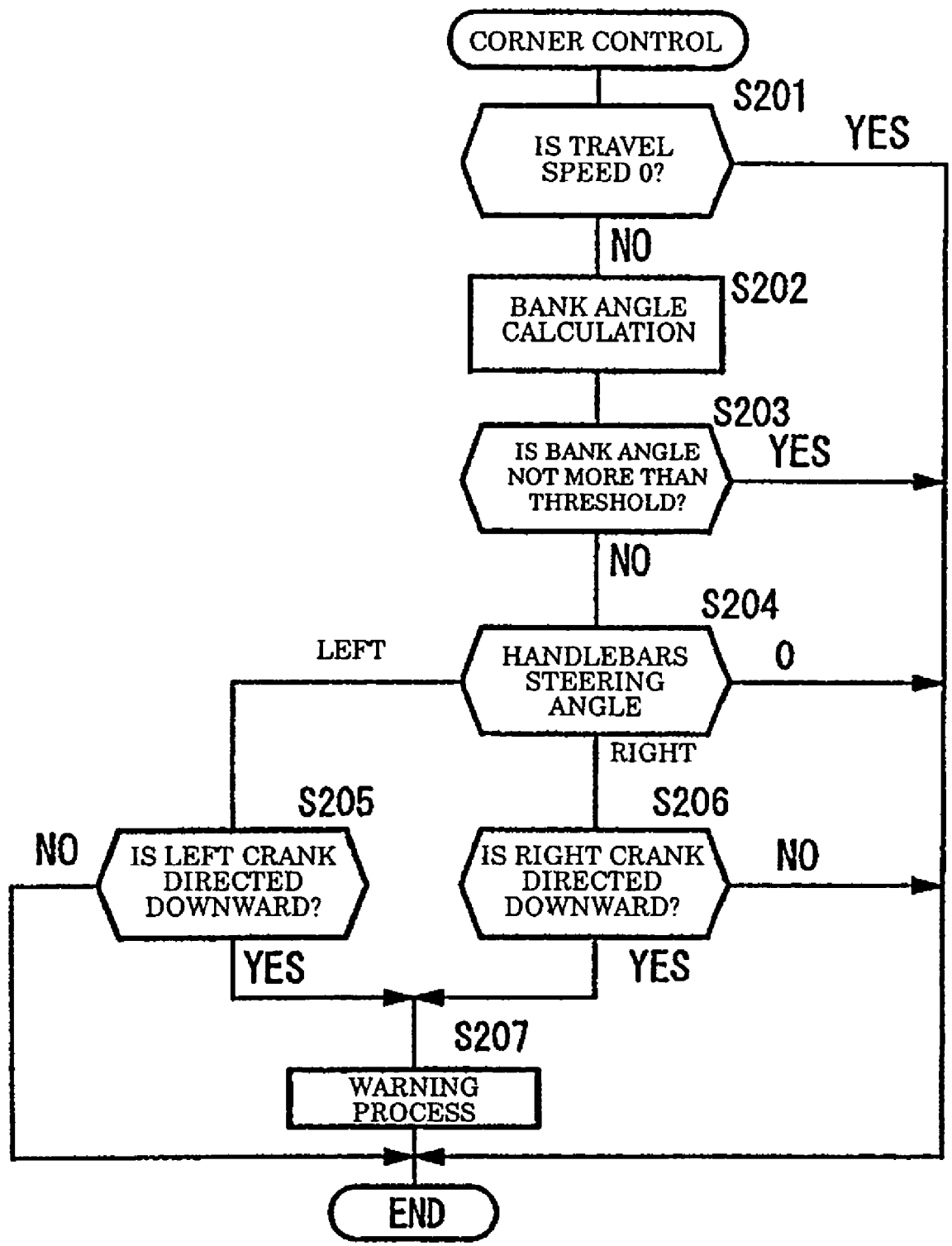
FIG. 16 is a flowchart of a corner control.

As shown in FIG. 16, when the simulation proceeds to the corner control mode per Step S104 in FIG. 15, the following steps are executed. First, it is checked, in Step S201, whether the travel speed V is zero (0). Since the bicycle is stopping when the travel speed V is zero (0), the process of the corner control is terminated. If V is not equal to zero (0), it is determined that the bicycle is traveling, and the process moves to Step S202.

In Step S202, a simulated bank angle $\theta_B$ is obtained from the travel speed V and the steering angle $\theta_H$ of the handlebars 28. By obtaining the bank angle $\theta_B$ and creating various travel situations, a realistic driving simulation is possible.

In Step S203, it is checked whether the bank angle $\theta_B$ is not less than a predetermined threshold. If the bank angle $\theta_B$ is not less than the threshold, the corner control is terminated. If the angle is less than the threshold, the process moves to Step S204.

In Step S204, the steering angle $\theta_H$ of the handlebars 28 is checked. Since the bicycle is going straight when the steering angle $\theta_H$ is zero (0), if the steering angle is zero (0), the process of the corner control is terminated. When the steering angle $\theta_H$ is a positive value and the driver is steering to the left, the process moves to Step S205. When the steering angle $\theta_H$ is a negative value and the driver is steering to the right, the process moves to Step S206.

In Step S205, it is checked whether the left crank 36L is directed downward. To be more specific, since the crank 36L is directed downward when the left approach sensor 132L is on, the signal of the left approach sensor 132L is checked. If the signal of the left approach sensor 132L is on, the process moves to Step S207. If the signal of the left approach sensor 132L is off, the process of the corner control is terminated.

In Step S206, it is checked whether the right crank 36R is directed downward. To be more specific, since the crank 36R is directed downward when the right approach sensor 132R is on, the signal of the right approach sensor 132R is checked. If the signal of the right approach sensor 132R is on, the process moves to Step S207, and if the signal of the right approach sensor 132R is off, the process of the corner control is terminated.

In Step S207, a warning process is performed. Specifically, the Step S207 is performed under conditions in which the bank angle $\theta_B$ is not less than a predetermined angle during cornering, and where the crank 36L or the crank 36R toward the inside during cornering is directed downward. Thus, the driving simulation is operating in a situation where the pedal 38L provided on the end of the crank 36L or the pedal 38R provided on the end of the crank 36R appears to rubs the road surface. By sending out a warning of such a situation, it is possible to allow the driver to learn a basic method of operating the bicycle so as to avoid these circumstances.

The warning described above is given by the warning section 188 (see FIG. 10) in cooperation with the display controller 184 and the voice driver 186. In this warning, a simulated sound of the pedals 38L and 38R rubbing the road surface is emitted from the speakers 15, and an image in which a bicycle and a person on the bicycle are staggering is displayed on the screen 14a by the display controller 184 (see FIG. 17). Moreover, in this image, particularly, the pedal 38L or 38R rubbing the road surface may be highlighted by blinking display, color change display or the like. Moreover, a message such as "warning" may be displayed on the screen 14a and highlighted.

As described above, by giving a visible and audible warning to the driver, the driver can feel as if the pedal 38L or 38R actually is rubbing the road surface. Thus, the warning is very effective in terms of the driver learning operation of a bicycle.

Moreover, in accordance with preference of the driver, a method for giving this warning may be selected. For example, electronic warning sound may be emitted, or a message "the pedal is rubbing the road surface" may be given by voice. Moreover, in the case where the bicycle simulation apparatus 10 is used for games, score deduction process may be performed in the Step S207. This score deduction process may be performed during various kinds of warning processes to be described later.

After completion of the Step S207, the corner control process is terminated. Note that, in this corner control process, only the state of the crank facing toward the inside of the corner is to be examined. However, the state of the crank facing toward the outside of the corner, which is on the opposite side, may be examined. Specifically, it is considered preferable that, during high-speed cornering of the bicycle, the pedal facing toward the outside of the corner be pressed down with some pressure. Thus, point addition process or the like may be performed by monitoring whether the crank facing toward the outside of the corner is properly pressed down.

In the corner control process, a warning may be issued in Step S207 if the handlebars 28 are operated by a predetermined amount or more in the same direction as the direction in which the crank is pressed down, regardless of the bank angle $\theta_B$. Moreover, a warning may be issued for an excessive steering angle for a given travel speed, as determined by searching a predetermined map based on the travel speed V and the steering angle $\theta_H$.

Next, the stepping mode will be described. The stepping mode is a mode which permits the driver to stop at a location corresponding to a temporary stop or the like, and to perform an operation such as safety check by putting his/her feet on the road surface.

Figure 18:
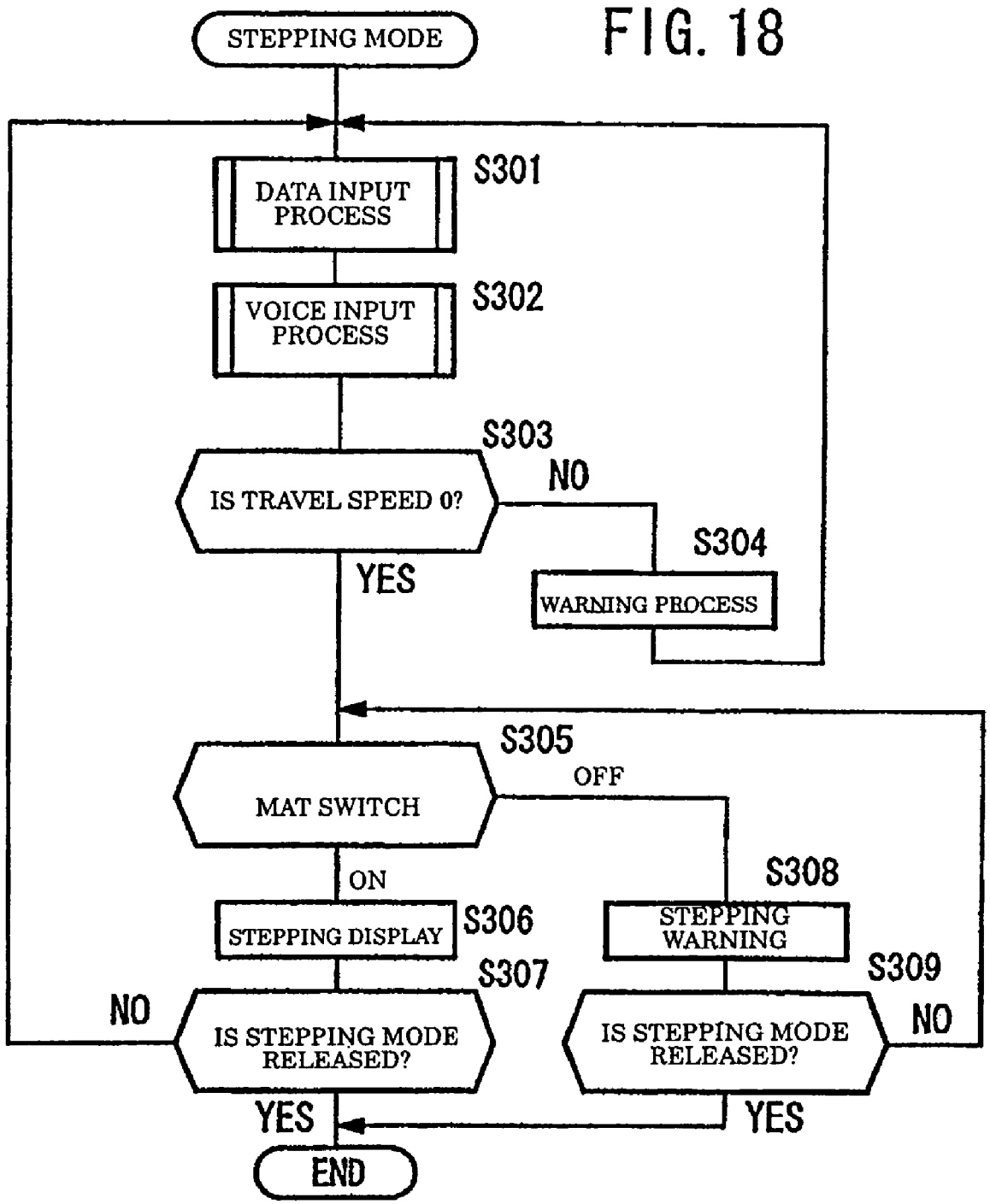
FIG. 18 is a flowchart of a stepping mode.
Figure 19:
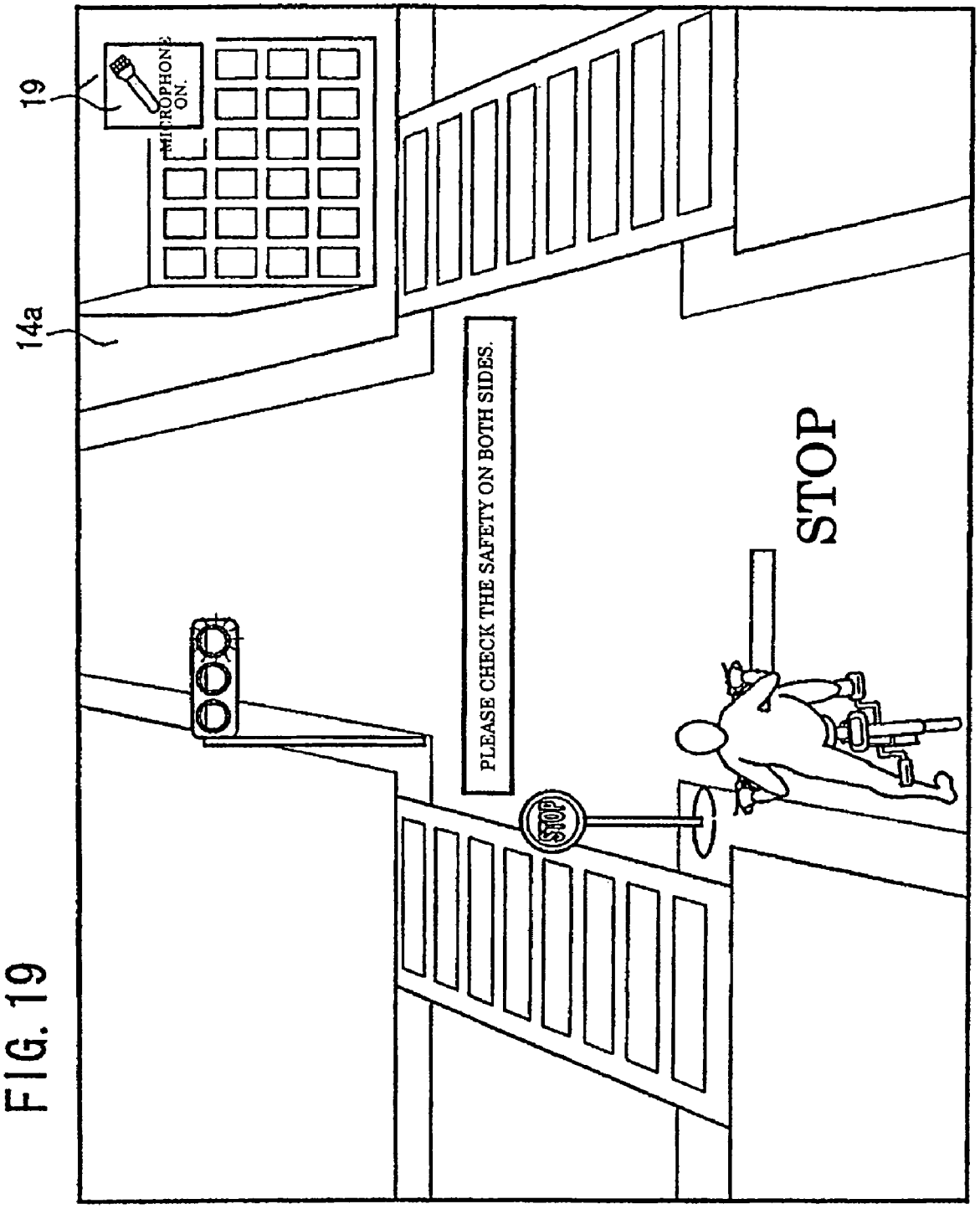
FIG. 19 is a screen display showing a state of a temporary stop in the stepping mode.

As shown in FIG. 18, when the simulation proceeds to the stepping mode per Step S7 in FIG. 13, the same data input process and voice input process as those of Steps S101 and S102 (see FIG. 15) described above are performed in Steps S301 and S302.

Next, in Step S303, it is checked whether the travel speed V is zero (0). If the travel speed V is not zero (0), the application proceeds to step S304 and the warning process is performed, and, thereafter, the process returns to Step S301. Specifically, the process stands by while continuously performing Steps S301 to S304 until the travel speed V becomes zero (0). If the travel speed V is zero (0), the process moves to the next Step S305.

In the warning process in Step S304, for example, an instruction such as "Brake and stop." is made. Moreover, if it is determined that the driving simulation is in a situation where the bicycle crosses a stop line at an intersection or the like, a loud warning or a warning of more highlighted display is given as a higher level warning. Alternatively, the driving simulation may be aborted.

In Step S305, as in the case of Step S1 described above, it is checked whether the mat switch 16 is turned on. Specifically, it is determined whether at least one of the left and right switches 150L and 150R is turned on. If the mat switch 16 is turned on, the process moves to Step S307, and if the switch is off, the process moves to Step S308.

In Step S306, an image of a bicycle and an image of a person putting his/her feet on the road surface while sitting on the saddle of the bicycle (see FIG. 19) are displayed on the display screen 14a by the display controller 184. Moreover, an instruction "Check the safety on both sides." is provided on the display screen 14a.

In the Step S306, for example, in order to surely check the safety on both sides, the driver may be allowed to utter "left" and "right." In this case, the voice is recognized by the voice recognition section 190, and images on the left and right sides at the spot of temporary stop are displayed on the screen 14a. Accordingly, if an approaching vehicle is displayed on these images, preferably, restart is prohibited.

In Step S307, it is checked whether the stepping mode is released. If the mode is not released, the process returns to Step S301 to continue the stepping mode process. Meanwhile, if the mode is released, the stepping mode process is terminated. The stepping mode is released, for example, in certain situations within the driving simulation, such as when a traffic signal changes from red to green, or when traffic safety on the left and right sides is carefully checked.

Meanwhile, in Step S308, a warning is given to indicate that the driver should place his/her feet on the road, since sensors indicate that the driver is not putting his/her feet down even though the travel speed is zero (0). Specifically, in operating not only a bicycle but also two-wheeled vehicles including a motorcycle and the like, it is important in terms of safety education, to put feet down and completely stop at a stop sign. Specifically, merely slowing down, or stopping for a moment and restarting without putting feet down, must be avoided. Therefore, the warning advising putting the feet on the road is given if it is determined that the feet are not put down based on the signal of the mat switch 16.

Figure 20:
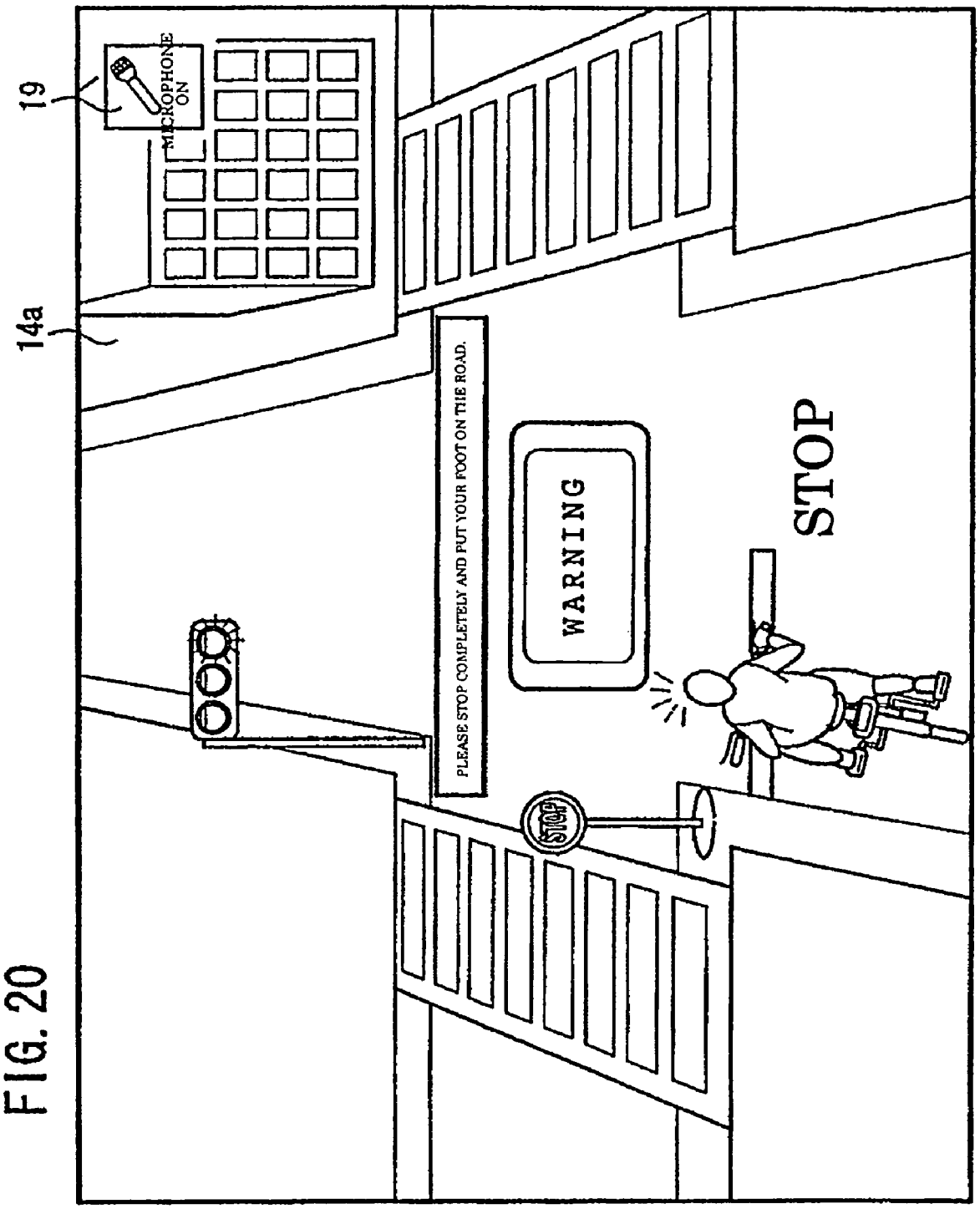
FIG. 20 is a screen display showing a warning in the stepping mode.

In the warning advising putting the feet on the road, as shown in FIG. 20, an image in which a bicycle and a person on the bicycle tumble (or stagger) may be displayed on the display screen 14a by the display controller 184. Moreover, instructions such as "Warning" and "Please stop completely and put your feet on the road." may be given.

Moreover, the number of times the Step S308 has been executed may be counted. If the number reaches a predetermined value or more, an image in which the bicycle has completely tumbled may be displayed on the display screen 14a, and a high-level warning may be given.

In Step S309, as in the case of Step S307 described above, it is checked whether the stepping mode is released. If the mode is released, the stepping mode process is terminated, and if the mode is not released, the process returns to Step S305.

Next, the walking mode will be described. The walking mode is a mode which permits the driver to walk the bicycle on a pedestrian dedicated road or the like. The walking mode is, for example, a mode for learning how to walk a bicycle without disturbing other pedestrians and the like.

Figure 21:
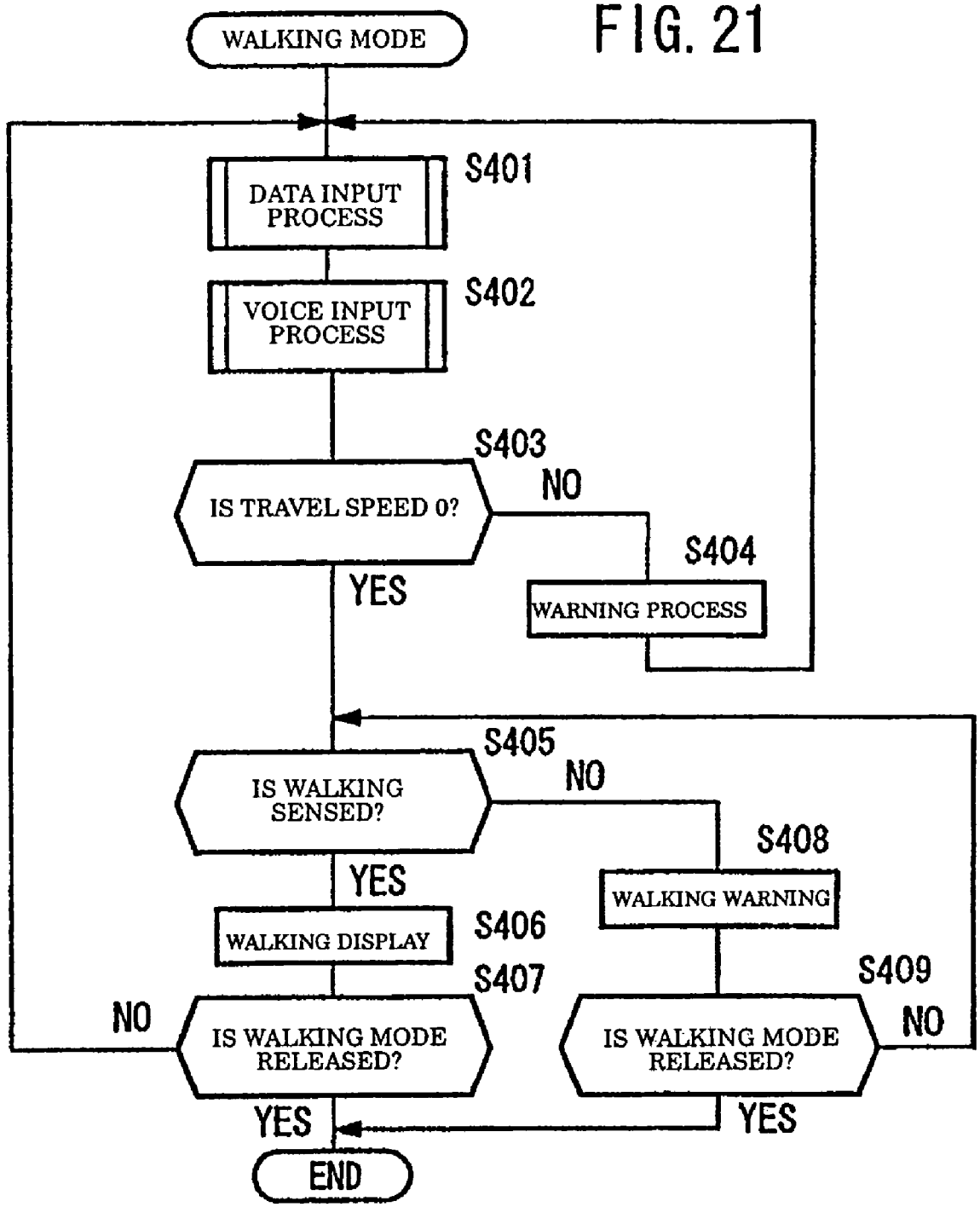
FIG. 21 is a flowchart of a walking mode.

As shown in FIG. 21, when the simulation proceeds to the walking mode per Step S9 in FIG. 13, the same processes as those of Steps S301 to S304 described above are executed. In other words, the data input process, the voice input process, the travel speed check process and the warning process are performed in Steps S401 to S404, respectively.

If the travel speed V is zero (0) in Step S403, the application proceeds to Step S405, where it is checked whether the driver is walking. When walking is sensed via mat 16, the process moves to Step S406. In other cases, the process moves to Step S408.

Figure 22:
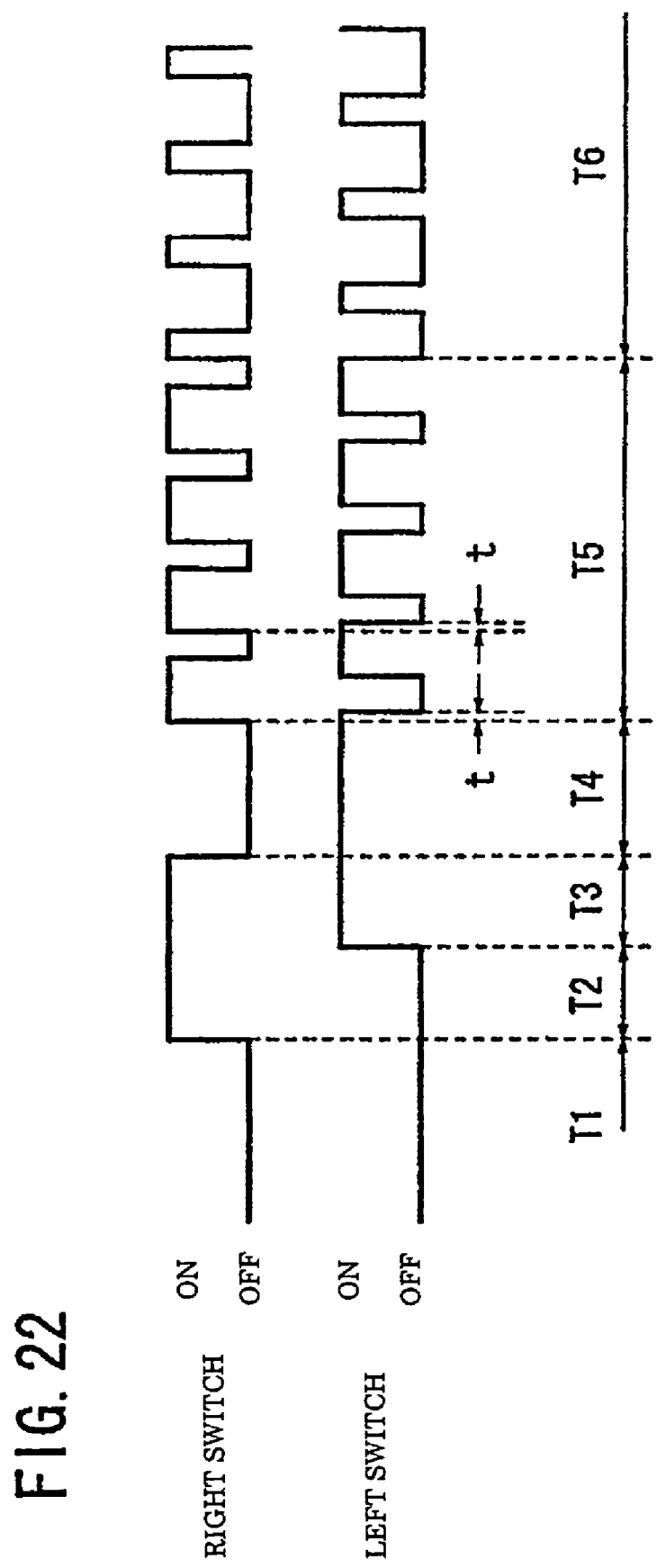
FIG. 22 is an input signal time chart of a right switch and a left switch in a mat switch.

Walking is sensed through a sensor signal analysis based on signals of the left and right switches 150L and 150R. As seen in FIG. 22, in a time period T1 in which both of the left and right switches 150L and 150R are continuously off for a predetermined time or more, it is determined that the driver is riding on the bicycle. In time periods T2 and T4, in which only one of the left and right switches 150L and 150R is on for a predetermined time or more, it is determined that the driver's foot is on the road. In a time period T3 in which both of the left and right switches 150L and 150R are continuously on for a predetermined time or more, it is determined that both of the driver's feet are on the road. In a time period T5 in which the left and right switches 150L and 150R are alternately and repeatedly turned on and off, and includes a time interval t when both of the left and right switches 150L and 150R are turned on, it is determined that the driver is walking the bicycle. Moreover, in a time period T6, in which the left and right switches 150L and 150R are alternately and repeatedly turned on and off and which does not include a time interval wherein both of the left and right switches 150L and 150R are turned on, it is determined that the driver is running while pushing the bicycle.

Specifically, in Step S405, when the signals are activated in the pattern shown in time period T5, the process moves to Step S406. Otherwise, the process moves to Step S408.

Figure 23:
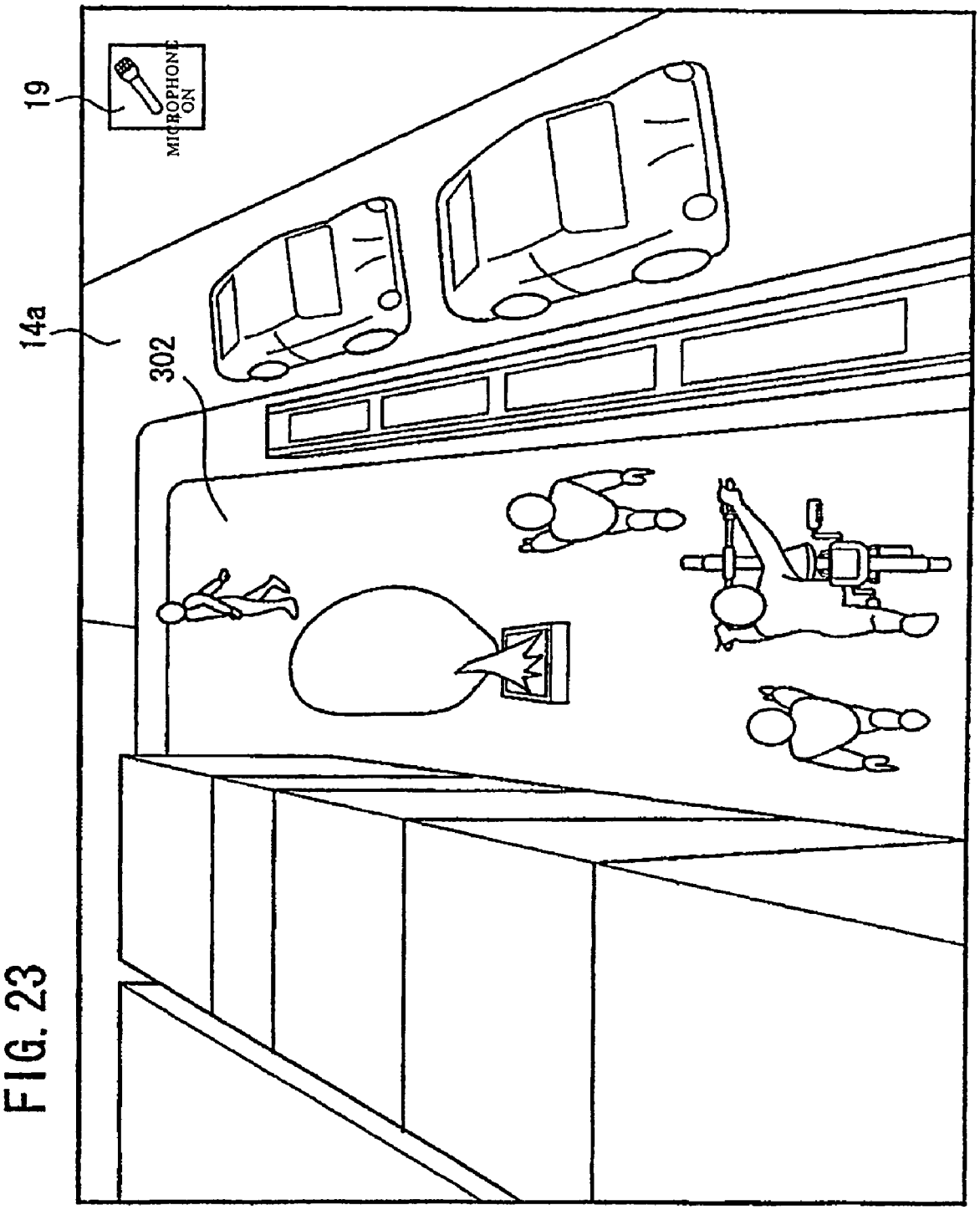
FIG. 23 is a screen display in the walking mode.

In Step S406, an image in which a dismounted driver is walking the bicycle is displayed on the display screen 14a by the display controller 184 (see FIG. 23). In this event, based on the steering angle $\theta_H$ detected by the steering angle sensor 50, the travel direction of the bicycle on the screen 14a may be changed. Moreover, the forward speed of the driver may be changed upon determination, based on sensor input, of a distinction between walking the bicycle and running while pushing the bicycle.

In Step S407, it is determined whether the walking mode is released. If the mode is not released, the process returns to Step S401 to continue the process of the walking mode. If the mode is released, the process of the walking mode is terminated. The walking mode is released, for example, when the driver reaches an end of a sidewalk or an end of a pedestrian crossing on which the driver is walking the bicycle.

Meanwhile, in Step S408, a walking warning is given since the driver is not walking the bicycle. Specifically, since two-wheeled vehicles such as a bicycle should be walked on sidewalks, a predetermined warning is given based on the signal of the mat switch 16 when the vehicle is not walked at appropriate times during simulated conditions.

The walking warning includes, for example, instructions such as "Warning," "Please stop and walk the bicycle," "Please walk" and "Please do not run". Moreover, the number of times that Step S408 is executed may be counted. If the number reaches a predetermined value or more, a high-level warning may be given.

In Step S409, as in the case of Step S407 described above, it is determined whether the walking mode is released. If the mode is released, the process of the walking mode is terminated. If the mode is not released, the process returns to Step S405.

Figure 24:
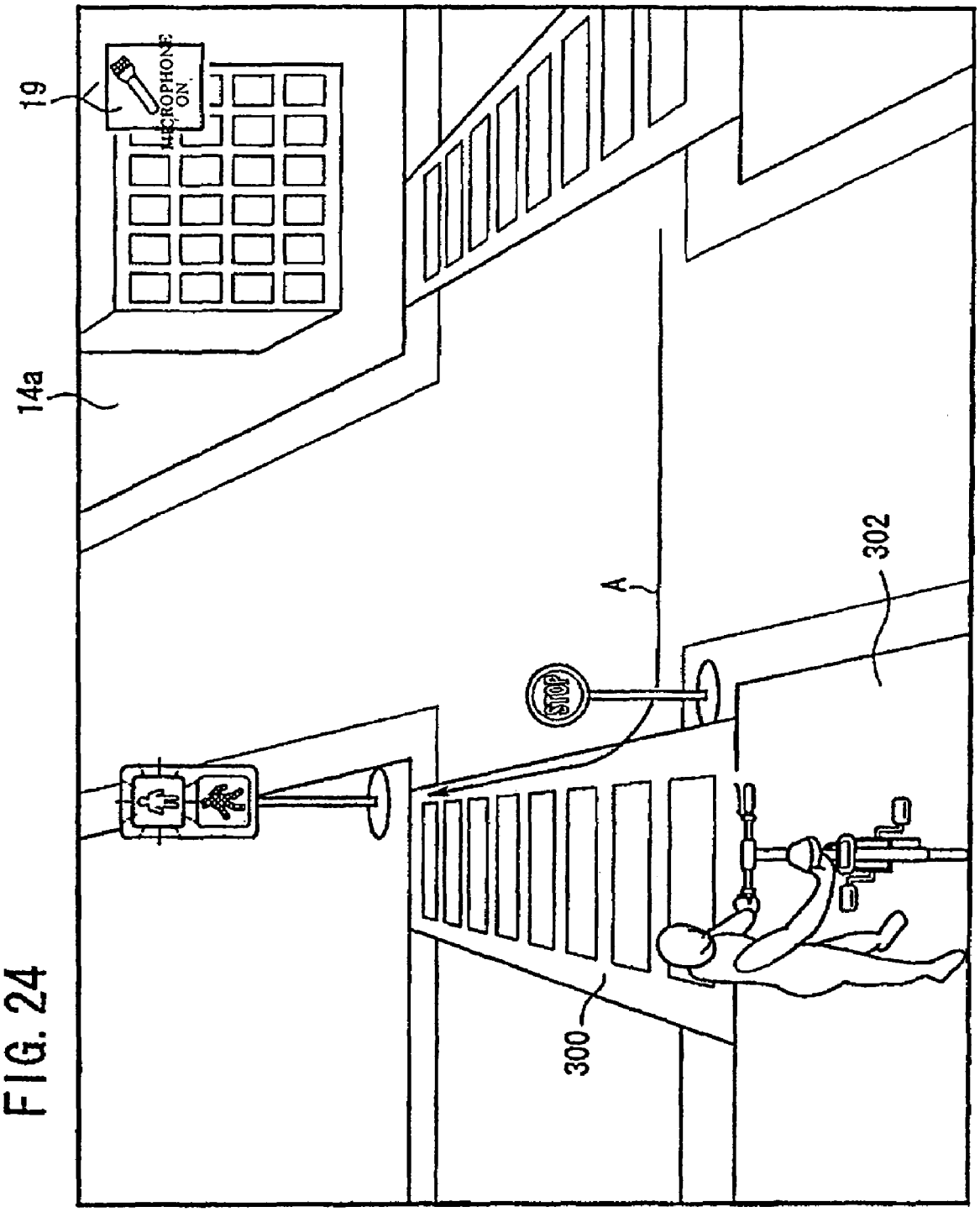
FIG. 24 is a screen display showing a state of walking back from a pedestrian crossing in a walking back mode.

Next, the walking back mode will be described. The walking back mode is a mode in which the driver, who has dismounted from the bicycle, reverses direction and walks the bicycle back to a previous location. For example, as shown in FIG. 24, when the driver tries to turn right at an intersection while traveling on the left side of a roadway, the driver first goes straight (traveling from right to left in the image of FIG. 24) to cross the first street, then turns right onto a pedestrian crossing 300 so as to follow a route indicated by an arrow A. However, when the light is red, the driver moves backward in order to escape to a sidewalk 302. In this event, the walking back mode is set.

Figure 25:
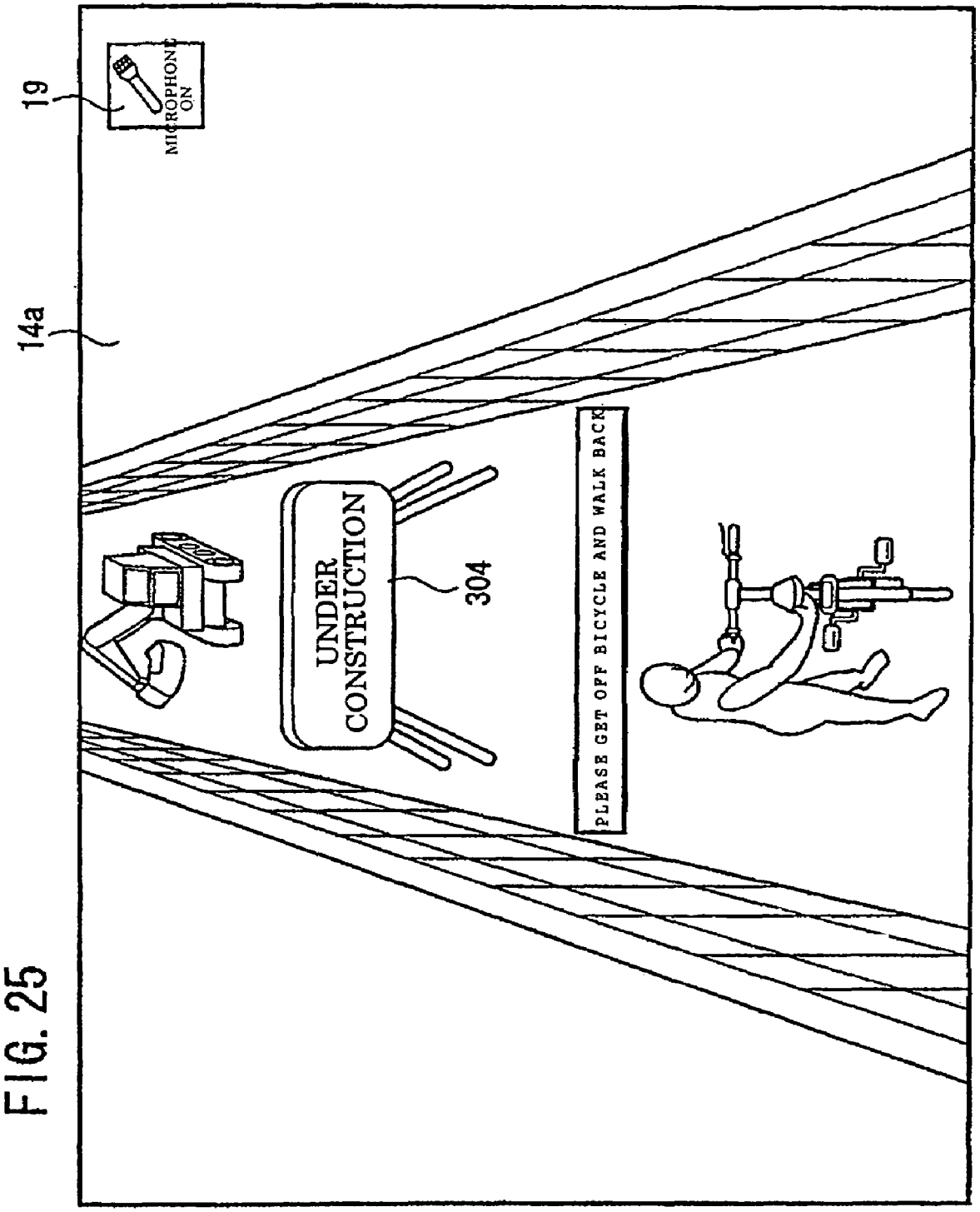
FIG. 25 is a screen display showing a state of walking back from the vicinity of an obstacle in the walking back mode.

Moreover, certain simulated situations are provided in which the bicycle cannot move forward and has to move backward. For example, as shown in FIG. 25, if the bicycle comes too close to a dummy obstacle 304 ahead of the bicycle, the bicycle cannot proceed and has to move backward. Thus, in such a case, the walking back mode is set. As a second example, when taking the bicycle in and out of a parking space, the walking back mode simulating a walking back operation may be set.

Figure 26:
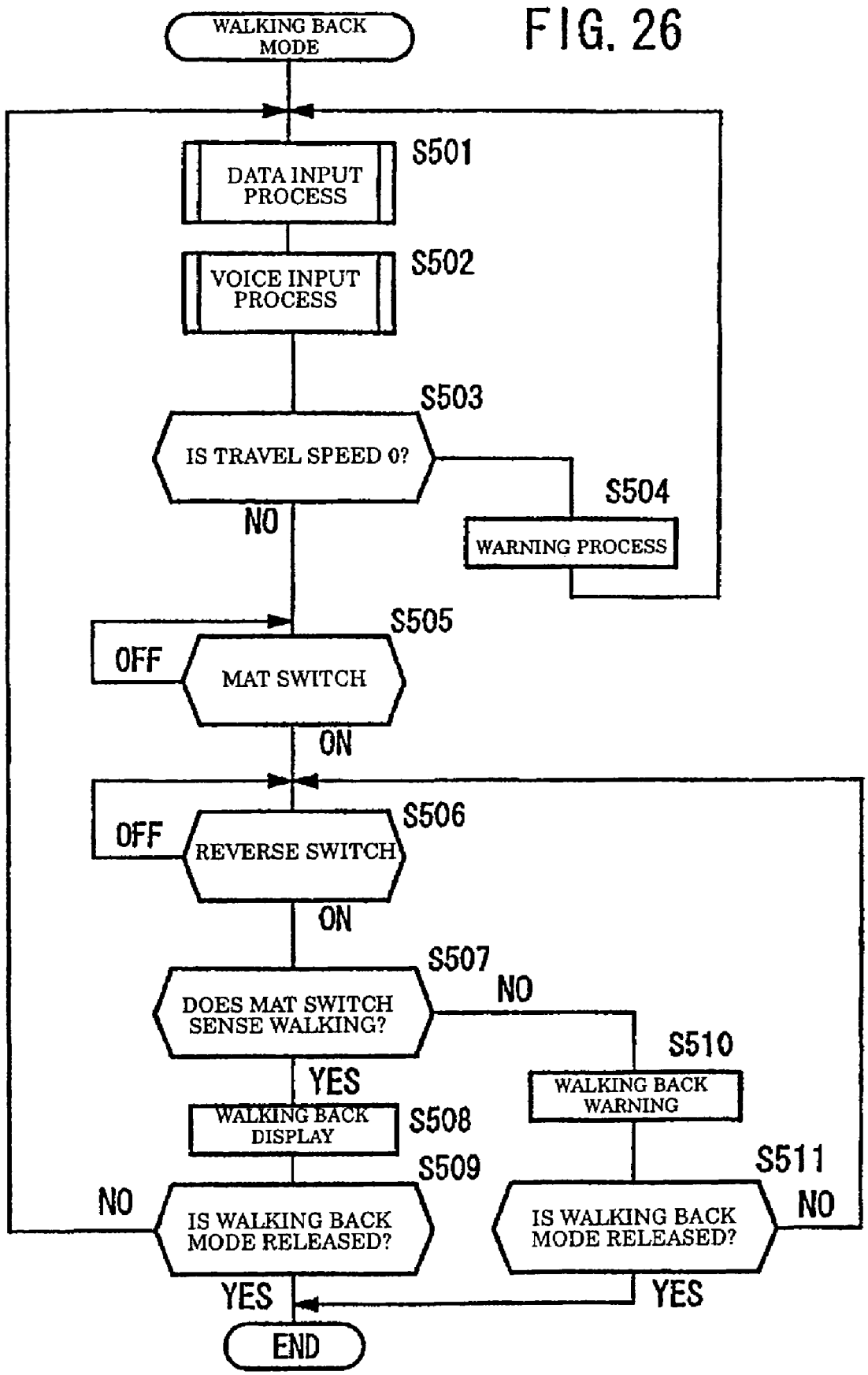
FIG. 26 is a flowchart of the walking back mode.

As shown in FIG. 26, when the simulation proceeds to the walking back mode per Step S11 in FIG. 13, the same processes as those of Steps S301 to S304 described above are executed. In other words, the data input process, the voice input process, the travel speed check process and the warning process are performed in Steps S501 to S504, respectively.

When, in Step S503, the travel speed V is zero (0), as in the case of Step S1 described above, the process proceeds to Step S505 where it is checked whether the mat switch 16 is turned on. When the mat switch 16 is turned on, the process moves to Step S506, and when the switch is off, the process stands by in Step S503.

In Step S506, it is checked whether the reverse switch 140 is turned on. When the reverse switch 140 is turned on, the process moves to Step S507, and when the switch is off, the process stands by in Step S506. Specifically, when the driver gets off the bicycle and walks the bicycle back to a previous location, the driver generally walks back while holding the left portion of the handlebars 28 in his/her left hand and holding the saddle 24 in his/her right hand (see the images of the persons in FIGS. 24 and 25). This is because, when the driver tries to walk the bicycle back while holding only the handlebars 28 without holding the saddle 24, the handlebars 28 are rotated at the head tube 26, and the direction of walking back is indeterminate. Therefore, by holding the saddle 24 together with the lever 142, a good posture for walking the bicycle back is obtained. In this event, since the reverse switch 140 is turned on through the handgrip on the saddle 24, it is possible to recognize that the driver is ready to walk the bicycle back by detecting a signal of the reverse switch 140.

Moreover, the reverse switch 140 is provided underneath a rear portion of the saddle 24. Thus, when the driver sits on the saddle 24 and performs normal travel simulation in the travel mode described above or the like, the driver is unlikely to touch the reverse switch. Consequently, there is no risk of operating the reverse switch by accident. Specifically, the reverse switch 140 is disposed in a position which facilitates operation by the driver only when the driver gets off the bicycle. Thus, the walking back operation performed after getting off the bicycle becomes more realistic.

In Step S507, walking is sensed using mat 16 in approximately in the same manner as Step S405 described above. If walking is sensed, the process moves to Step S508. In other cases, the process moves to Step S510. In this event, since the driver stands next to the bicycle simulator 12, the driver steps on any one of the left and right switches 150L and 150R of the mat switch 16 at predetermined time intervals. Therefore, assuming the case where, for example, the driver stands on the left side of the bicycle simulator 12, a walking state may be detected based on only the signal of the left switch 150L, as discussed above with respect to the time chart of FIG. 22. Accordingly, when signals are obtained having the pattern shown in time periods T5 and T6, it may be determined that the driver is in the walking state.

In Step S508, as shown in FIGS. 24 and 25, an image in which a driver, who has dismounted from a bicycle, walks the bicycle back is displayed on the display screen 14a by the display controller 184. In this event, a walking back direction of the bicycle on the display screen 14a may be changed based on the steering angle $\theta_H$ detected by the steering angle sensor 50.

In Step S509, it is determined whether the walking back mode is released. If the mode is not released, the process returns to Step S501 to continue the walking back mode process. If the mode is released, the walking back mode process is terminated. In the case of the example shown in FIG. 24, the walking back mode is released when the bicycle completely moves back to the sidewalk 302 from the pedestrian crossing 300.

As described above, in the walking back mode, based on the movement of the driver operating the grip detector 56 of the bicycle simulator 12 as well as stepping on the mat switch 16 at predetermined time intervals, an image corresponding thereto is displayed on the screen 14*a*. Thus, the driver can feel as if he/she is actually walking the bicycle back. Moreover, after the bicycle has completely moved back, the walking back mode is released and the bicycle can move in any direction. Therefore, even if the bicycle comes too close to a simulated obstacle during the driving simulation, it unnecessary to terminate the driving simulation or perform an unnatural process such as deletion of the simulated obstacle. Thus, a realistic operation can be achieved.

Figure 27:
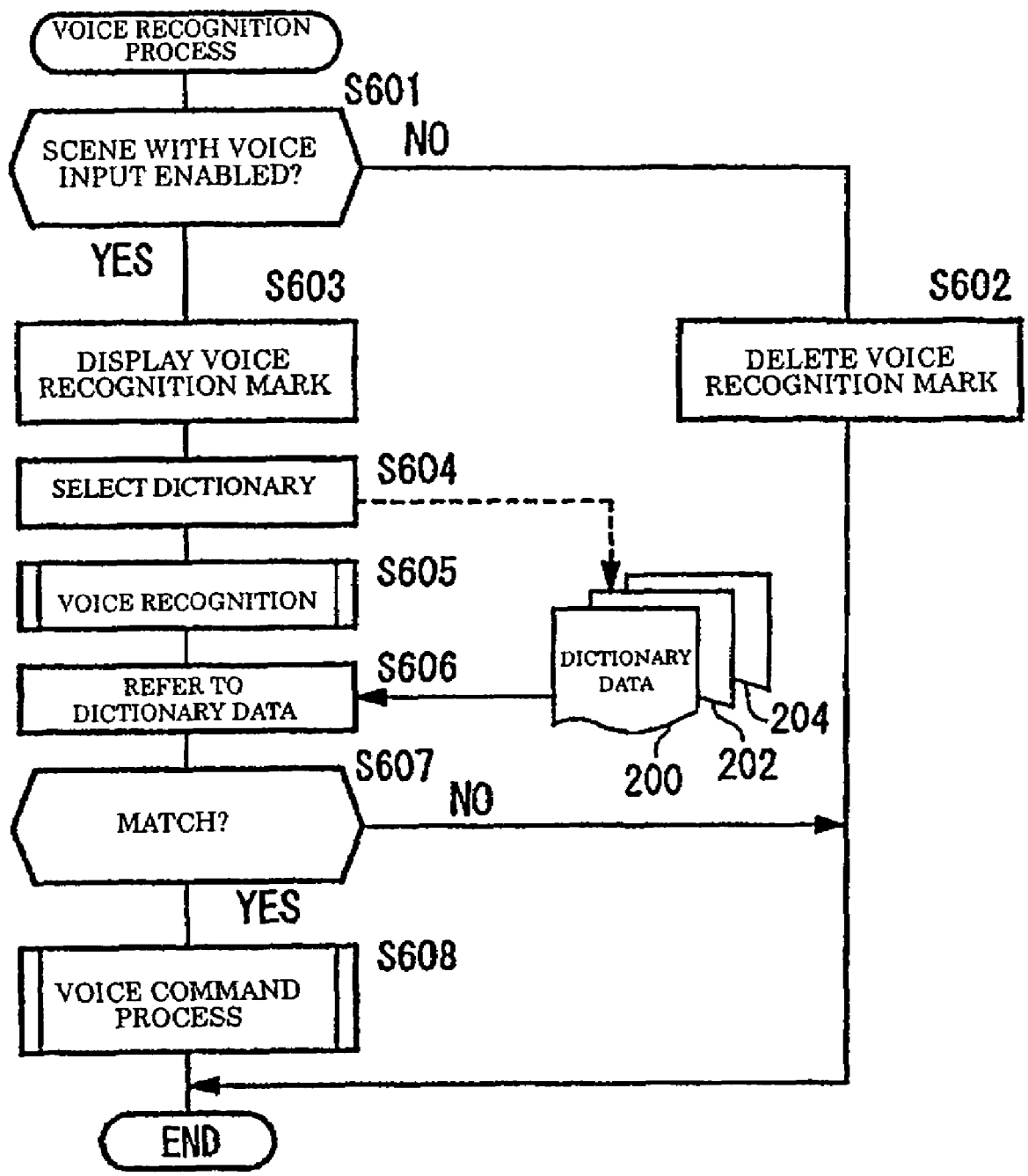
FIG. 27 is a flowchart showing contents of a voice recognition process.

Next, with reference to FIG. 27, description will be given of the contents of the voice recognition process performed in Steps S102, S302, S402 and S502 described above.

First, in Step S601, it is checked whether the driving simulation is in a situation where voice input is enabled. If the voice input is disabled, the process moves to Step S602, and if the voice input is enabled, the process moves to Step S603.

The voice input is enabled in several specific situations. For example, the voice in put is enabled when the simulation is in the foot-landing mode, the walking mode, the walking back mode, and travel modes other than cornering. The voice input is enabled in situations corresponding to the case where the process load applied on the CPU is relatively small. Accordingly, the voice input is disabled in situations where, for example, relatively large applied-load processes such as the arithmetic operation of the bank angle $\theta_B$, and determination of rotational angles of the cranks 36L and 36R based on signals of the left and right approach sensors 132L and 132R during cornering or the like in the travel mode are executed. The voice input is disabled in the case where the processing load applied on the CPU is relatively large.

Moreover, the processing load applied on the main controller 18 may be monitored based on a predetermined system monitor and a resource meter. If the processing load is not less than a predetermined value, the voice input may be disabled.

In Step S602, the voice recognition mark 19 on the display screen 14*a* is deleted or displayed so as to be faded, thereby showing that voice recognition is disabled. After the process of Step S602, the current process in the voice recognition process shown in FIG. 27 is terminated.

Meanwhile, in Step S603, the voice recognition mark 19 is clearly displayed on the display screen 14*a*, thereby showing that the voice recognition is enabled. The operator can easily recognize that the voice recognition process is enabled at the point by observing the voice recognition mark 19.

Whether the voice input is enabled may be indicated by, for example, turning on and off a predetermined indicator light. In this case, the indicator light may be provided in the vicinity of the visual display monitor 14 or the microphone 52.

In Step S604 (dictionary selection section), one of the types of dictionary data recorded in the storage section 194 is selected. Specifically, the stop/walking dictionary data 200 is selected in the modes other than the travel mode, the town travel dictionary data 202 is selected in a situation of traveling through town in the travel mode, and the suburban travel dictionary data 204 is selected in a situation of traveling in the suburbs in the travel mode.

Moreover, if it is determined that the operator is a child based on the flags set in Step S3 described above, the child dictionary data 200*a*, 202*a* and 204*a* and the common dictionary data 200*c*, 202*c* and 204*c* are selected. If it is determined that the operator is an adult, the adult dictionary data 200*b*, 202*b* and 204*b* and the common dictionary data 200*c*, 202*c* and 204*c* are selected.

For example, if the operator is a child in the situation of traveling through town, the child dictionary data 202*a* and the common dictionary data 202*c* among the town traveling dictionary data 202 are selected.

Note that selection of the dictionary data may be performed when a mode transitions (for example, during branch processing in Steps S4, S6, S8 and S10 in FIG. 13). In addition, predetermined dictionary data may be previously loaded into the RAM and the like from the storage section 194. Thus, high-speed data access is possible.

In Step S605, the operator's voice command inputted from the microphone 52 is analyzed, and it is recognized that the operator said "right" or "left," for example.

In Step S606, by referring to the operator's voice command recognized in Step S605 described above, and the dictionary data selected in Step S604 described above, phrase data matching the recognized voice is searched for and specified.

In Step S607, it is checked whether matching phrase data exists in the dictionary data by search process in Step S606. If the matching phrase data exists, the process moves to Step S608, and if not, the current process is terminated.

In Step S608, the voice command process is performed based on the phrase data matching the recognized voice. For example, when the recognized voice is recognized as "left" in the case where the town travel dictionary data 202 is selected, a scene assumed to be on the left side of the operator is displayed on the screen 14*a* in cooperation with the display controller 184 after the common dictionary data 202*c* (see FIG. 12) is referred to. Moreover, when the operator is a child and the recognized voice is recognized as "heavy" in the case where the town travel dictionary data 202 is selected, the child dictionary data 202*a* is referred to, and, thereafter, the load plate 90 is tilted so as to approach the rim 30*a* by rotating the motor 96 through the sub-controller 58 as well as the speed coefficient for calculating the travel speed V is increased. Furthermore, the value of the gear ratio assumed at the point is displayed on the screen 14*a*. After the process of this Step S608, the current voice recognition process shown in FIG. 27 is terminated.

In such a voice recognition process, voice analysis is performed by selecting a type of dictionary data corresponding to the mode of travel and the operator. Thus, the volume of the individual dictionary data may be small, and the processing loads when the main controller 18 refers to and searches the dictionary data are small. Thus, high-speed processing is possible. Moreover, the CPU, the RAM and the like of the main controller 18 may be inexpensive or of low capacity. Furthermore, the dictionary data are individually provided in accordance with the modes of travel and the operator. Accordingly, a situation is avoided in which similar data exist as the recorded phrase data, and erroneous recognition of voices is prevented. Thus, recognition accuracy is improved.

Since the child dictionary data 200*a*, 202*a* and 204*a* and the adult dictionary data 200*b*, 202*b* and 204*b* are provided, words generally used by children (for example, the word "heavy") and words used by adults (for example, the word "upshift") can be used to comfortably execute voice commands. In addition, drivers in a wide range of ages can use the apparatus 10. Since the child dictionary data 200*a*, 202*a* and 204*a* and the adult dictionary data 200*b*, 202*b* and 204*b* are separated, there are no problems such as erroneous recognition of voices and lowering of the processing speed, which are caused by designing a system for both children and adults. Since a bicycle is a vehicle driven by both a child and an adult, such a voice recognition process is effective particularly in the bicycle simulation apparatus 10 for a bicycle among various bicycle simulation apparatuses. Moreover, separation of the dictionary data by language, such as Japanese and English, is effective in the bicycle simulation apparatus 10 used in a plurality of destinations, including exports.

Furthermore, the voice recognition process can be stopped in predetermined situations. Thus, the processing load applied on the CPU can be suppressed, and the load can be equalized. Therefore, CPU performance in a light load never becomes redundant, and the CPU operation rate can be improved. Moreover, in accordance with the specific operating state of the voice recognition process, the voice recognition mark 19 is displayed, or not displayed, on the display screen 14*a*. Accordingly, the driver can check the operating state of the voice recognition process at a glance, and instructions can be given by voice at the appropriate time. Thus, excessive attention to timing of giving the voice instructions is not required. As a result, operability of the bicycle simulation apparatus 10 is improved.

Figure 28:
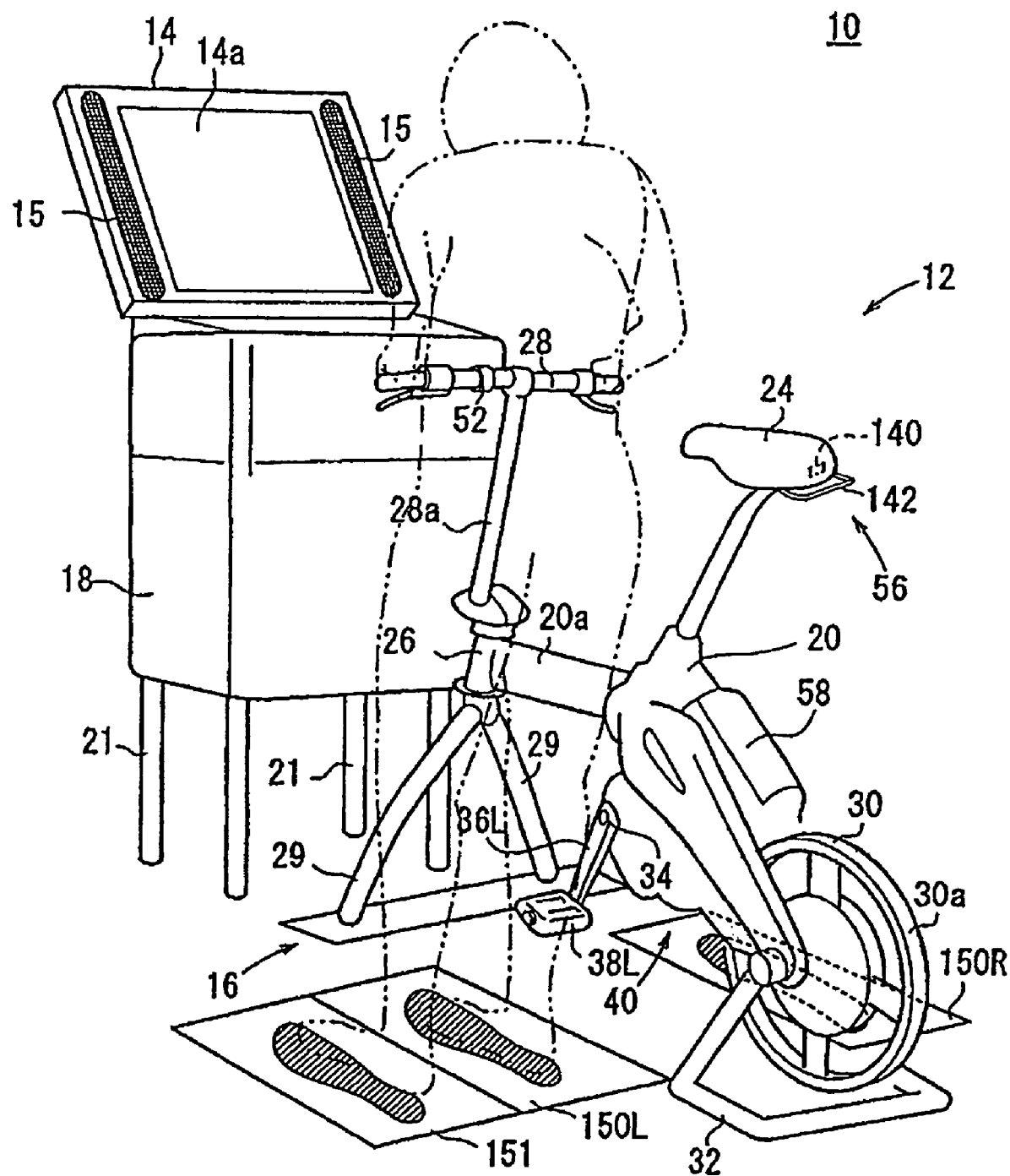
FIG. 28 is a perspective view of a bicycle simulation apparatus equipped with an additional switch.

Note that, as shown in FIG. 28, an additional switch 151 similar to the left switch 150L may be provided on the left side of the left switch 150L. Thus, simulated walking may be performed by alternately stepping on the left switch 150L and the additional switch 151 in the walking mode and the walking back mode. Consequently, the walking and walking back movements can be performed in the same posture as that of actually walking the bicycle. Thus, the hands-on feeling is further enhanced. In this case, the driver steps on the additional switch 151 with his/her left foot and steps on the left switch 150L with his/her right foot. In the case where the bicycle simulation apparatus 10 is used by persons accustomed to walking the bicycle by standing on the right side thereof, the additional switch 151 may be provided on the right side of the right switch 150R.

Moreover, in the above description, it is assumed that the grip detector 56 is provided underneath the rear portion of the saddle 24. However, an operating section corresponding to the grip detector 56 may be disposed in a position where the driver can easily operate the section in walking back movement. Thus, the grip operating section may be provided in the rear of the saddle 24, as in the example of a grip detector 210 shown in FIG. 29.

The grip detector 210 is a modified example of the grip detector 56, and includes a reverse switch 212. Reverse switch 212 is a momentary limit switch provided in the rear of the saddle 24. The grip detector 210 also includes a lever 214 for turning on and off the reverse switch 212, and a bracket 216 as a supporting unit. The lever 214 can be elastically slid forward against the elastic force of a spring 218 through the bracket 216 by operation of an operating portion 214*a* formed on the rear portion of lever 214. When the lever 214 slides forward, a contactor 214*b* comes into contact with the reverse switch 212 to turn on the switch. The operating portion 214*a* extends upward from the lower rear portion, and has approximately the same height as that of an upper rear portion of the saddle 24. After dismounting from the bicycle simulator 12, the driver can easily operate the grip detector by touching the upper surface of the saddle 24 and the rear surface of the operating portion 214*a* at the same time and pulling the operating portion 214*a*. This grip detector 210 achieves the same effect as that of the grip detector 56 described above.

The bicycle subjected to the driving simulation in the bicycle simulation apparatus 10 may be a tricycle, a motor-assisted bicycle or the like, as long as the bicycle has at least basic components of a bicycle, such as handlebars, pedals and cranks.

The bicycle simulation apparatus according to the present invention is not limited to the above-described embodiment, and various configurations can be adopted without departing from the scope of the present invention.

While a working example of the present invention has been described above, the present invention is not limited to the working example described above, but various design alterations may be carried out without departing from the spirit and scope of the present invention as set forth in the claims.

What is claimed is:

1. A bicycle simulation apparatus comprising:
    a bicycle simulator including a pair of cranks connected to left and right ends of a crankshaft, each crank having a pedal provided on a distal end thereof, and handlebars which can be rotated left and right;
    a handlebar operation detector which detects a steering angle of the handlebars;
    a crank position detector which detects rotational positions of the cranks based on operation of the pedals,
    a visual display which displays scenes based on a simulated travel speed determined based on rotational positions of the cranks and the steering angle; and
    a warning section which issues a warning when all of the following conditions are determined:
        the bicycle simulator is operating based on the simulated travel speed;
        the steering angle exceeds a predetermined amount; and
        one of said cranks is directed downward during a turning operation of the handlebars and the turning direction is the same direction in which said crank is directed downward.

2. The bicycle simulation apparatus according to claim 1, wherein the bicycle simulator further includes a sound generation section, and when the warning is issued by the warning section, an image in which a bicycle and a person riding the bicycle staggers is displayed on the visual display and a sound of a pedal rubbing a road surface is emitted from the sound generation section.

3. The bicycle simulation apparatus according to claim 1, including a pair of said crank position detectors which are associated with the pair of cranks, respectively.

4. The bicycle simulation apparatus according to claim 1, wherein the crank position detector comprises a detected portion which rotates along with the crankshaft, and an approach sensor which detects the detected portion.

5. The bicycle simulation apparatus according to claim 1, wherein the warning section also issues the warning under the condition that a simulated bank angle obtained from the simulated travel speed and the steering angle is greater than a predetermined angle.

6. The bicycle simulation apparatus according to claim 1, wherein the bicycle simulator further includes a voice recognition section.

7. The bicycle simulation apparatus according to claim 1 wherein the bicycle simulator further includes a voice recognition section operably connected to the visual display such that the scene presented on the visual display is altered based on voice commands received by the voice recognition section.

8. The bicycle simulation apparatus according to claim 1 wherein the bicycle simulator further includes a voice recognition section, the voice recognition section having a phrase database, the phrase database including different phrase dictionaries each directed to a unique user group.

9. The bicycle simulation apparatus according to claim 1 wherein the bicycle simulator further includes
    a metal flywheel operably connected to the crankshaft such that operation of the pedals produces rotation of the flywheel, and a load plate adjustably positioned adjacent to the flywheel, the load plate comprising a magnetic member positioned to confront a periphery of the flywheel, and wherein the bicycle simulator adjusts proximity of the load plate to the metal flywheel so as to control the force required to operate the pedals.

10. The bicycle simulation apparatus according to claim 1 wherein the bicycle simulator further includes a metal flywheel operably connected to the crankshaft such that operation of the pedals produces rotation of the flywheel, and a load plate adjustably positioned adjacent to the flywheel, the load plate comprising a magnetic member positioned to confront a periphery of the flywheel, and wherein interaction of the load plate with the flywheel simulates a gear change.

11. A bicycle simulation apparatus comprising:

a bicycle simulator including a pair of cranks connected to left and right ends of a crankshaft, each crank having a pedal provided on a distal end thereof, and handlebars which can be rotated left and right;

a handlebar operation detector which detects a steering angle of the handlebars;

a crank position detector which detects rotational positions of the cranks based on operation of the pedals, a visual display which displays scenes based on a simulated travel speed associated with rotational positions of the cranks and the steering angle;

a voice recognition section which varies the display scene on the visual display based on a received voice command; and a warning section which issues a warning when a simulated bicycle is in danger of a crash, based on rotational positions of the cranks and the steering angle.

12. The bicycle simulation apparatus according to claim 11, wherein the bicycle simulator further includes a sound generation section and a warning section, and wherein when the warning is issued by the warning section, the visual display displays an image in which the simulated bicycle staggers and an audible warning is emitted from the sound generation section.

13. The bicycle simulation apparatus according to claim 11, including a pair of the crank position detectors which are associated with the pair of cranks respectively.

14. The bicycle simulation apparatus according to claim 11, wherein the crank position detector comprises a detected portion which rotates along with the crankshaft, and an approach sensor which detects the detected portion.

15. The bicycle simulation apparatus according to claim 11, wherein the bicycle simulator further includes a warning section which issues a warning when a simulated bank angle obtained from the simulated travel speed and the steering angle is greater than a predetermined angle.

16. The bicycle simulation apparatus according to claim 11, wherein the crank position detector comprises a detected portion which rotates along with the crankshaft, a first approach sensor which detects the detected portion at a first orientation with respect to the bicycle simulator, and a second approach sensor which detects the detected portion at a second orientation with respect to the bicycle simulator.

* * * * *